US006141193A

United States Patent [19]

Mercer

[11] Patent Number: 6,141,193

[45] Date of Patent: Oct. 31, 2000

[54] SHUNT REGULATOR WITH SHUTDOWN PROTECTION TO PREVENT EXCESSIVE POWER DISSIPATION

[75] Inventor: Mark J. Mercer, Tucson, Ariz.

[73] Assignee: National Semiconductor Corporation, Santa Clara, Calif.

[21] Appl. No.: 09/270,490

[22] Filed: Mar. 15, 1999

[51] Int. Cl.[7] ........................ H02H 7/00

[52] U.S. Cl. ........................ 361/18; 361/78; 361/87; 361/93.9

[58] Field of Search ........................ 361/18, 78–79, 361/87, 93.1, 93.9; 323/274–277, 284–285, 220, 223

[56] References Cited

U.S. PATENT DOCUMENTS

| | | | |
|---|---|---|---|
| 4,127,885 | 11/1978 | Adam et al. | 361/18 |
| 4,390,829 | 6/1983 | Jarrett | 323/231 |
| 4,717,867 | 1/1988 | Forehand | 323/223 |
| 4,899,098 | 2/1990 | Gariboldi | 323/277 |
| 5,260,644 | 11/1993 | Curtis | 323/226 |
| 5,444,358 | 8/1995 | Delepaut | 323/222 |
| 5,465,188 | 11/1995 | Pryor et al. | 361/18 |
| 6,023,155 | 2/2000 | Kalinsky et al. | 323/274 |

*Primary Examiner*—Michael J. Sherry
*Attorney, Agent, or Firm*—Skjerven, Morrill, MacPherson LLP; Omkar K. Suryadevara

[57] ABSTRACT

A circuit (hereinafter "auto-shutoff regulator") for regulating the power provided to a load automatically opens and closes a switch (hereinafter "protection switch") to keep itself from being damaged by excessive power dissipation. The auto-shutoff regulator includes: (1) a shunt regulator coupled in parallel with the load and a power supply, and (2) another circuit (hereinafter "overpower detector") that monitors the power dissipated by the shunt regulator. The overpower detector has a control line (hereinafter "power shutoff line") that is coupled to the protection switch. When the power dissipated in the shunt regulator exceeds a predetermined threshold, the overpower detector drives a signal active on the power shutoff line, thereby to open the protection switch. Opening of the protection switch shuts off the supply of power to the shunt regulator, thereby to protect the shunt regulator from damage caused by excessive power dissipation. The overpower detector is also responsive to the voltage on a line coupled to the power supply. When the voltage falls below a threshold value, the overpower detector gets reset and drives the signal on the power shutoff line inactive, thereby to close the protection switch and restore the supply of power to the shunt regulator.

20 Claims, 11 Drawing Sheets

| FIG. 5A | FIG. 5B |
|---|---|

SHUNT REGULATOR WITH SHUTDOWN PROTECTION TO PREVENT EXCESSIVE POWER DISSIPATION

BACKGROUND OF THE INVENTION

1. Field of the Invention

This invention relates generally to a circuit for regulating the supply of power to a load, and in particular, to a circuit that opens and closes a switch to automatically turn on and off a shunt regulator, depending on the power dissipated by the shunt regulator.

2. Description of the Related Art

Various types of protective circuits are well known in the art. For example, see U.S. Pat. No. 5,465,188 granted to Pryor et al. and U.S. Pat. No. 4,899,098 granted to Gariboldi.

Also well known is a circuit called "shunt regulator" that controls the voltage applied to a load by controlling the current flowing through a branch coupled in parallel to a power supply and an electrical load. For example, U.S. Pat. No. 5,444,358 granted to Delepaut describes a "regulator . . . [that] includes a branch circuit therein which in turn includes a series connection of at least a shunt switch . . . , said branch circuit being coupled in parallel with both a load and a power supply. Said power supply shunt regulator further includes current limitation means for generating an analog control signal that is applied to a control electrode of said shunt switch so as to limit the amount of current flowing through said shunt switch . . ." (col. 2, lines 10–29).

Delepaut further states that "the peak discharge current will clearly be limited to a fixed value dependent solely on the resistance of the current sensing resistor and a transfer function of the analog control signal realized by the current limitation means" (col. 2, lines 33–37). See also U.S. Pat. No. 4,390,829 granted to Jarrett for another example of a shunt regulator.

SUMMARY OF THE INVENTION

A regulator (also called "auto-shutoff regulator") automatically regulates the power (in one embodiment the voltage) being supplied to a load by changing a current drawn at an input terminal (hereinafter "current input terminal") that is coupled to the power supply. According to the principles of this invention, the regulator automatically opens and closes a switch (hereinafter "protection switch") to keep itself from drawing an excessive current from the current input terminal and thereby avoid being damaged by excessive power dissipation therein, e.g. in response to fluctuations in the power provided by the power supply, or fluctuations in the impedance of the load or both.

In one embodiment, the auto-shutoff regulator includes two parts: (1) a shunt regulator coupled in parallel with the load and the power supply, and (2) a device (hereinafter "overpower detector") that monitors the power dissipated by the shunt regulator. When the power dissipated in the shunt regulator exceeds a predetermined threshold, the overpower detector drives a binary signal active to open the protection switch. Opening of the protection switch disrupts the supply of power to the shunt regulator, thereby to protect the shunt regulator from damage caused by excessive power dissipation. In this embodiment the protection switch is also coupled to the load and when opened, also disrupts the supply of power to the load.

Also, in this particular embodiment, the shunt regulator maintains a voltage that is supplied to the load at a constant value. Specifically, the shunt regulator draws a current (hereinafter "shunt current") from the current input terminal (described above) and changes the magnitude of the shunt current to maintain the supply of constant voltage to the load. The shunt regulator includes a status terminal, and drives on the status terminal a status signal indicative of the magnitude of power dissipated in the shunt regulator.

The overpower detector has a status line (hereinafter "power status line") that is coupled to the status terminal of the shunt regulator. The overpower detector also has a power shutoff terminal that is coupled via a control line (hereinafter "power shutoff line") to the protection switch. The overpower detector drives the control signal active on the power shutoff terminal thereby to open the protection switch when the status signal on the power status line indicates that the power dissipated in the shunt regulator exceeds a predetermined maximum, e.g. when the status signal has a magnitude greater than the magnitude of a reference signal.

The reference signal has a magnitude that is predetermined to indicate the maximum power that can be dissipated in the shunt regulator without damage, e.g. not exceeding the maximum rated temperature of the die that contains the shunt regulator. In one embodiment the reference signal is sensitive to the ambient temperature e.g. a current (called "CTAT" current) that increases with the ambient temperature so that the overpower detector drives the control signal active at a lower value of dissipated power when the ambient temperature rises.

An overpower detector (as described herein) is also responsive to the voltage provided by the power supply. When the voltage falls below a predetermined value (e.g. 4.8 volt), the overpower detector gets reset and drives the control signal inactive to close the protection switch. When closed, the protection switch restores the supply of power to the shunt regulator that in turn resumes normal operation. In this embodiment, closure of the protection switch also results in resumption of the supply of power to the load as the switch is also coupled to the load.

In one embodiment, the shunt regulator includes a current sensor and a current sink that are coupled in series each with the other, and both are in a path that carries a majority (greater than 50%) of the current (also called "shunt current") drawn by the shunt regulator. The shunt regulator also includes a controller (hereinafter "shunt current controller") that is coupled parallel to the current sensor and the current sink. The shunt current controller generates an analog control signal to control the magnitude of a portion (also called "bleed current") of the shunt current passing through the current sink. The shunt current controller includes a reference signal generator that generates a reference signal based e.g. on the bandgap voltage of the semiconductor material or on a zener diode. The shunt current controller controls the magnitude of the bleed current drawn by the current sink in the normal manner.

The current sensor that is in series with the current sink is coupled to the status terminal (described above), and generates thereon the status signal to indicate the magnitude of the bleed current. In one variant of this embodiment, the current sensor includes one-half of a current mirror that generates a voltage indicative of the bleed current. The other half of the current mirror is included in a signal comparator that in turn is included in the above-described overpower detector. The two halves of the current mirror are coupled each to the other through the power status line and the status terminal.

The signal comparator in the overpower detector includes an output driver (such as a buffer) that drives a binary signal active when the magnitude of current generated in the comparator by the other half of the current mirror exceeds the magnitude of the current used as the reference signal. The overpower detector also includes a storage element (such as a latch) that receives and stores the binary signal from the signal comparator. The storage element supplies the stored signal to the protection switch via the power shutoff line.

The storage element has a reset terminal that is coupled by a reset line to the power supply. When the voltage provided by the power supply on the reset line drops below a predetermined value (e.g. 4.8 volt), the storage element is reset. Thereafter, the storage element provides an inactive signal on the power shutoff line, until the signal comparator again supplies an active signal (as described above). Therefore, the storage element closes the protection switch, thereby to resume the supply of power to the shunt regulator when the voltage falls below the predetermined value.

One or more parts of the auto-shutoff regulator can be implemented in an integrated circuit (IC) die, or alternatively as discrete components. In one particular embodiment, all parts of the auto-shutoff regulator are implemented by discrete components. However, in another embodiment, an auto-shutoff regulator is implemented entirely in an IC die that includes, as the protection switch, one or more high voltage transistors (e.g. FETs). The same IC die can also include the load, depending on the implementation.

When implemented in an integrated circuit die, the auto-shutoff regulator prevents excessive power dissipation, thereby avoiding a potentially flammable situation. Therefore, an auto-shutoff regulator as described herein prevents a fire hazard, and helps such an integrated circuit die meet safety standards (e.g. as required by Underwriters Laboratory or by International Electrotechnical Commission).

DETAILED DESCRIPTION

Figure 1A:
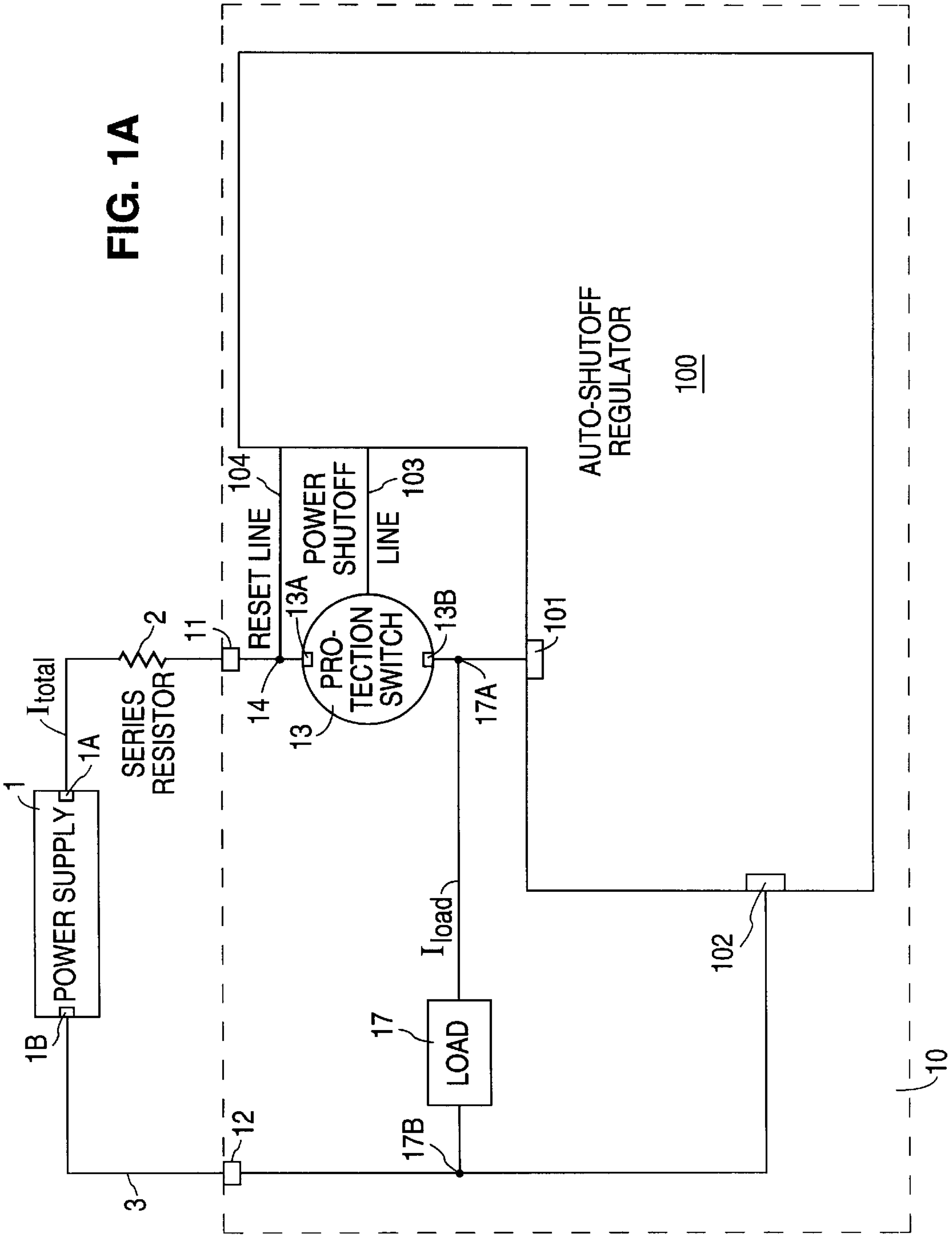
FIG. 1A illustrates, in a high level block diagram, a protection switch and a circuit (called "auto-shutoff regulator") that, in accordance with the invention, operates the protection switch to prevent excessive power dissipation inside the circuit.

According to the principles of this invention, a circuit automatically shuts off the supply of power to a shunt regulator when the power dissipated in the shunt regulator exceeds a predetermined threshold. Therefore, the circuit protects the shunt regulator from damage caused by excessive power dissipation.

Specifically, an auto-shutoff regulator 100 (FIG. 1A) in accordance with the invention has an input terminal (called "current input terminal") 101 and an output terminal (called "current output terminal") 102 that are coupled to the respective power terminals 1A and 1B of a power supply 1. As used herein "coupled" is intended to include one or more devices intervening between the coupled terminals, whereas "connected" is intended to mean no intervening devices between the connected terminals.

Auto-shutoff regulator 100 regulates the supply of power from power supply 1 to load 17. Specifically, auto-shutoff regulator 100 changes total current Itotal (passing through series resistor 2) by changing another current drawn from current input terminal 101 (that is coupled to power terminal 1A). Auto-shutoff regulator 100 includes a shunt regulator that normally maintains a voltage V17A at node 17A constant (thereby to act as a voltage source respectively). In an alternative embodiment, such a shunt regulator is implemented to maintain the current Iload drawn by load 17 from node 17A constant, thereby to act as a current source, in a manner known to the skilled electrical engineer.

Depending on the fluctuations in voltage V1A delivered by power supply 1 at node 1A (FIG. 1A), a regulator without a protection device could change the magnitude of current Ishunt to such a high level as to physically damage itself (e.g. due to inadequate heat transfer from the regulator). To avoid such damage, auto-shutoff regulator 100 (FIG. 1A) automatically monitors the power dissipated within itself, and opens a switch (hereinafter "protection switch") 13 when the dissipated power exceeds a threshold.

Specifically, protection switch 13 is located in a path between power supply 1 and current input terminal 101. Protection switch 13 has a very low "on" resistance (e.g. 0.0Ω) and a low voltage drop (e.g. 0.1 volt depending on the magnitude of current Itotal in FIG. 1A) as compared to, for example the device described by Pryor et al. in U.S. Pat. No. 5,465,188. Therefore protection switch 13 dissipates a negligible amount of power (e.g. 1 milliwatt) when closed (during normal operation).

In the just-described implementation, switch 13 has one terminal 13B that is coupled to ground, while another terminal 13A that is coupled to power terminal 1A as described below. Therefore, switch 13 when opened must withstand the highest voltage to be provided by power supply 1 without suffering any damage. Note that switch 13 may pass a negligible (e.g. less that 1%, such as 1 microamp) amount of leakage current in the normal manner. In one implementation, switch 13 includes a high voltage transistor (defined to be a transistor that can withstand the highest voltage as described above), although a power transistor can also be used in certain implementations.

Switch 13 is coupled by a power shutoff line 103 to auto-shutoff regulator 100. Auto-shutoff regular 100 drives a binary signal active on power shutoff line 103 to open switch 13. When opened, protection switch 13 disrupts current Ishunt (e.g. causes current Ishunt to go to zero). Moreover, in this particular embodiment, protection switch 13 is also in a path between power supply 1 and load 17, and when opened disrupts current Iload drawn by load 17.

Auto-shutoff regulator 100 has a reset line 104 that is coupled to power terminal 1A. After current Ishunt is disrupted, auto-shutoff regulator 100 remains responsive to the voltage on reset line 104, and is reset when the voltage falls below a predetermined value, e.g. 1 volt. On being reset, auto-shutoff regulator 100 drives the binary signal on power shutoff line 103 inactive. In response to the inactive signal, protection switch 13 closes, thereby to resume the supply of current from power supply 1 to regulator 100 at the current input terminal 101, and also to load 17. Therefore, auto-shutoff regulator 100 automatically opens and closes protection switch 13 to keep itself from being damaged by excessive power dissipation.

In one implementation, power supply 1 is external to an integrated circuit (abbreviated as "IC") die 10 in which are implemented auto-shutoff regulator 100 and protection switch 13. In such an implementation, terminals 101 and 102 of auto-shutoff regulator 100 are coupled to bond pads 11 and 12 respectively of IC die 10. Bond pads 11 and 12 are in turn coupled to the respective power terminals 1A and 1B.

In the embodiment illustrated in FIG. 1A, bond pad 11 is coupled through a series resistor 2 to power terminal 1A, and is coupled through protection switch 13 to current input terminal 101. Series resistor 2 steps down the voltage provided by power supply 1 to a level needed by load 17. For example, series resistor 2 has a resistance of 200 ohms, thereby to step down the voltage from 12 volts at power terminal 1A to 4 volts at bond pad 11 (assuming IC die 10 draws a total current of 0.04 amp).

Moreover, in this particular implementation, load 17 is implemented in the same IC die 10 as auto-shutoff regulator 100, and is also coupled to bond pads 11 and 12. Specifically, load 17 is coupled between two nodes 17A and 17B that are in turn coupled to the respective terminals 101 and 102, and to the respective bond pads 11 and 12.

In one example, power supply 1 maintains voltage V1A at power terminal 1A constant at 12 volts from a time T0 to a time T1 and therefore voltage V17A at a node 17A coupled to load 17 remains substantially constant at 4 volts (FIG. 1B) between times T0 and T1. Thereafter, voltage V1A starts rising. In the example illustrated in FIG. 1B, a non-zero value for voltage V103 corresponds to an asserted logic state (also called "active state"), and a zero value to a non-asserted logic state (also called "inactive state"). However, in other examples, the logic states can be inverted (e.g. the asserted logic state being indicated by a non-zero value).

In this example, auto-shutoff regulator 100 maintains voltage V17A (FIG. 1B) at substantially the same level (e.g. 4 volts) between times T0 and T2, by increasing the magnitude of current Itotal passing through series resistor 2 between times T1 and T2. Therefore, auto-shutoff regulator 100 dissipates an increased amount of power between times T1 and T2 (as compared to the power dissipated between times T0 and T1).

At time T2, auto-shutoff regulator 100 determines that the dissipated power exceeds a predetermined threshold, e.g. shunt current Ishunt has a magnitude greater than the magnitude of a reference current. Therefore at time T2, auto-shutoff regulator 100 starts driving a binary signal V103 to an active state on power shutoff line 103. In the example, binary signal V103 is an active high signal (i.e. has a non-zero value).

When signal V103 (FIG. 1B) is active, the voltage of signal V103 follows voltage V11 at node 11 (FIG. 1A), although the logic level stays the same (at level 1). In response to the active state of binary signal V103, protection switch 13 opens. When protection switch 13 opens, voltage V17A at node 17A falls to zero, thereby preventing auto-shutoff regulator 100 from drawing excessive power after time T2, e.g. in response to a peak P1 between times T4 and T5, and another peak P2 between times T5 and T6.

Figure 1B:
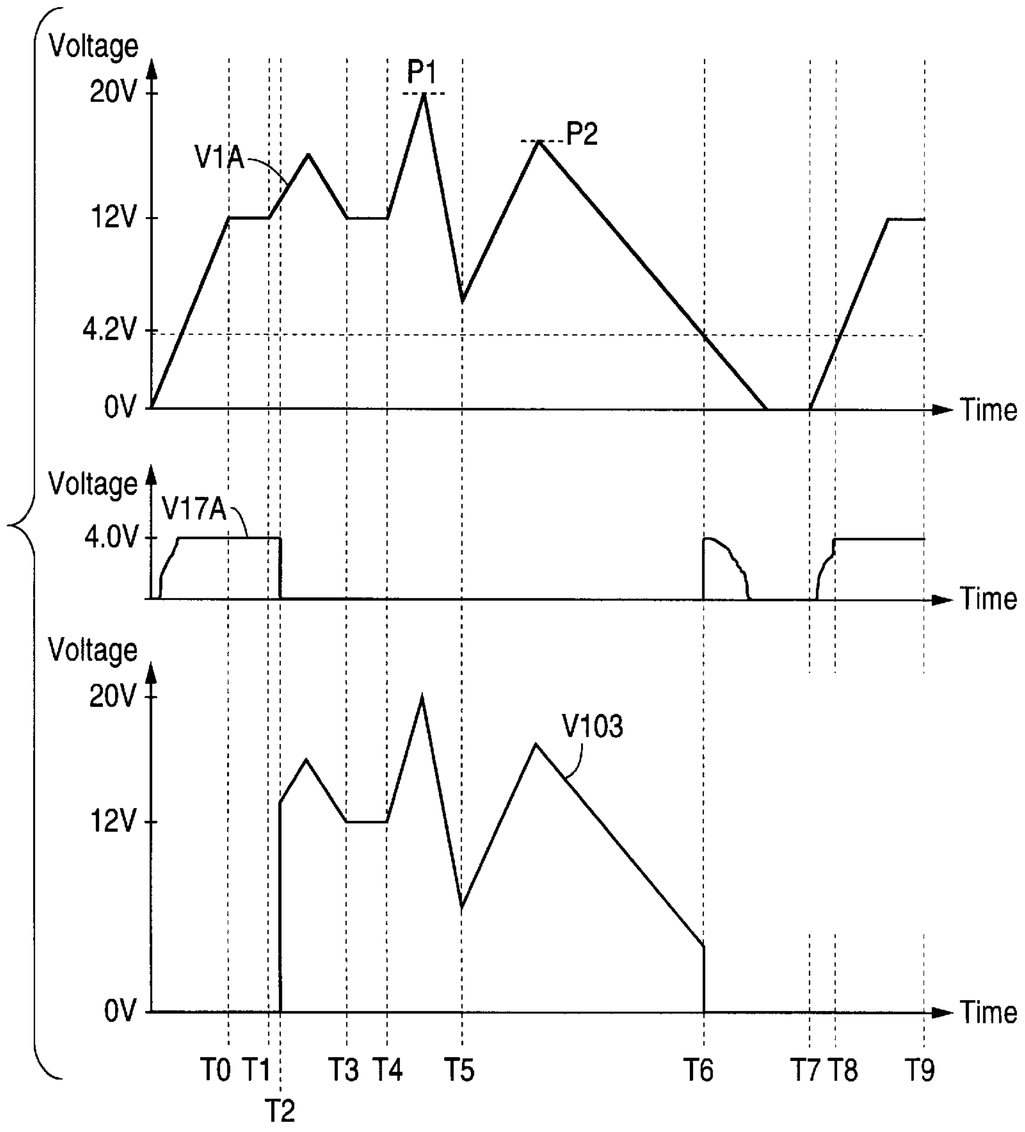
FIG. 1B illustrates, in timing diagrams, certain signals generated during operation of the circuit illustrated in FIG. 1A.

Binary signal V103 on power shutoff line 103 stays active, e.g. at logic level 1, until auto-shutoff regulator 100 is reset at time T6, due to voltage V1A on reset line 104 dropping below a predetermined value, e.g. 4.8 volt. Therefore, at time T6, auto-shutoff regulator 100 starts driving binary signal V103 inactive, e.g. drives the voltage level on line 103 to zero volt (FIG. 1B).

In response to the inactive state of binary signal V103, protection switch 13 closes, thereby to couple current input terminal 101 to power terminal 1A. Therefore, when the voltage V1A starts to rise at time T7, voltage 17A also begins to rise in a proportional manner. Note that once auto-shutoff regulator 100 determines that the power dissipation has exceeded the threshold at time T2, auto-shutoff regulator 100 is insensitive to variations in voltage V1A and the state of binary signal V103 is unaffected) until voltage V1A falls below the predetermined value (e.g. at time T6).

For example, the state of auto-shutoff regulator 100 is unaffected by voltage V1A going back to the normal voltage (12 volts in this example) between times T3 and T4, and even by falling to a very low voltage (e.g. 7 volts) at time T5. Auto-shutoff regulator 100 is insensitive to all such fluctuations and gets reset only at time T6 when voltage V1A falls below the predetermined value of 4.8 volt.

Figure 2A:
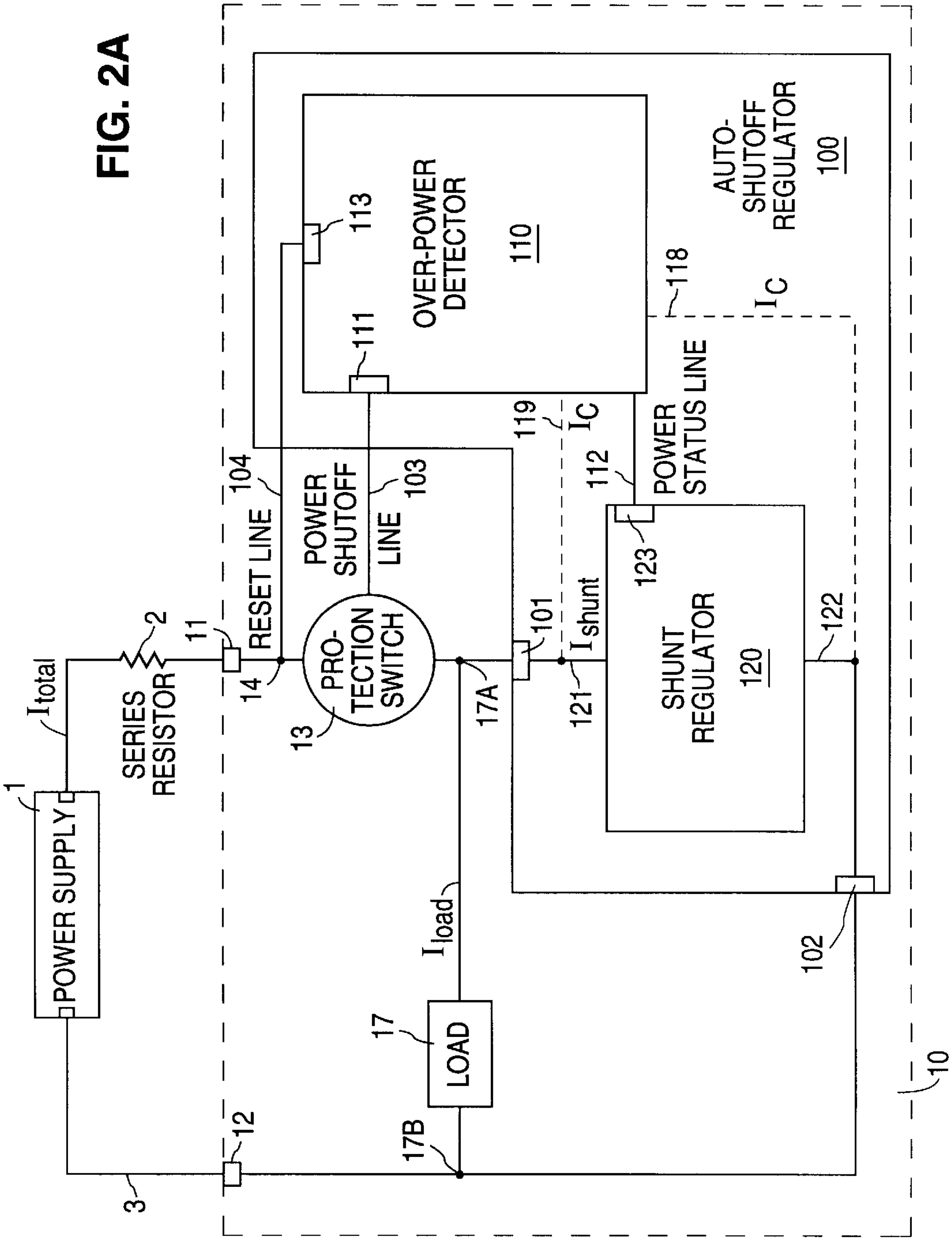
FIGS. 2A and 2B illustrate, in an intermediate level block diagram and a low level block diagram, respectively, the parts inside a circuit of the type illustrated in FIG. 1A.

In one embodiment, auto-shutoff regulator 100 includes a shunt regulator 120 (FIG. 2A) having a shunt input line 121 coupled to current input terminal 101, and a shunt output line 122 coupled to current output terminal 102. In this particular embodiment, shunt regulator 120 maintains the voltage at current input terminal 101 (and therefore also at node 17A) constant, e.g., at 4 volts, by changing the magnitude of the current Ishunt drawn at current input terminal 101. Shunt regulator 120 also has a status terminal 123, and supplies on status terminal 123 a signal indicative of the magnitude of power being dissipated in shunt regulator 120.

Auto-shutoff regulator 100 also includes an overpower detector 110 having a power status line 112 that is coupled to status terminal 123 of shunt regulator 120. Overpower detector 110 also has a power shutoff terminal 111 that is coupled by power shutoff line 103 to protection switch 13. Overpower detector 110 drives a control signal active on power shutoff terminal 111 when the signal on power status line 112 indicates that the power dissipated in shunt regulator 120 exceeds a predetermined maximum. In this embodiment, after driving the control signal active, overpower detector 110 is insensitive to the status signal on power status line 112 until being reset as described below.

Overpower detector 110 also has a reset terminal 113 that is coupled to reset line 104. When the signal on reset terminal 113 falls below a predetermined value, overpower detector 110 drives the binary signal on power shutoff terminal 111 inactive, and becomes sensitive to the status signal on line 112. As illustrated by lines 119 and 118 in FIG. 2A, overpower detector 110 is coupled between terminals 101 and 102 and draws a small current Ic therefrom during operation. Note that overpower detector 110 can be supplied power in other ways and therefore lines 119 and 118 are optional (shown by dashed lines).

In one variant of the above-described embodiment, shunt regulator 120 includes a current sink 125 (FIG. 2B) and a shunt current controller (also called "current controller")

124 that are coupled in parallel each with the other between shunt input line 121 and shunt output line 122. Current sink 125 dissipates a majority of the power (i.e. greater than 50% of the power) dissipated in shunt regulator 120 by drawing a current Ibleed from shunt input line 121. Current sink 125 is coupled by sink control line 127 to shunt current controller 124.

Shunt current controller 124 draws a minimal amount of current Iz, and changes an analog signal on sink control line 127 in a manner necessary to maintain voltage V17A at node 17A (or current Iload drawn by load 17 in the alternative embodiment) at a constant level. In response to a change in the analog signal, current sink 125 changes the magnitude of current Ibleed in the appropriate manner.

In this embodiment, shunt regulator 120 also includes a current sensor 126 that is coupled in series with current sink 125, between shunt input line 121 and shunt output line 122. Current sensor 126 is coupled to status terminal 123, and supplies on status terminal 123 a signal indicative of the magnitude of current Ibleed. Current Iz drawn by shunt current controller 124 is substantially constant (e.g. varies less than 1%). Therefore the signal provided by current sensor 126 on status terminal 123 is indicative of changes in current Ishunt (because Ishunt=Iz +Ibleed, wherein Iz is constant).

Also, current Ic passing through overpower detector 110 is described below, and consists of a constant portion and a portion that varies as a scaled version of current Ibleed. In this embodiment, Ic is negligible (e.g. less than 1%) when compared to Ibleed. Therefore current Ibleed provides an indication of the current passing through auto-shutoff regulator 100.

In one variant of the embodiment, current sensor 126 includes one half of a current mirror, and the other half of the current mirror is included in overpower detector 110 (as described below in reference to signal comparator 114). Note, however, that in other variants, current sensor 126 can be implemented by any circuit that monitors current. In one embodiment, the voltage across current sink 125 is equal to the voltage at status terminal 123. The signal provided by current sensor 126 on status terminal 123 indicates the power dissipated in shunt regulator 120.

Overpower detector 110 (FIG. 2B) includes three parts: a signal comparator 114 coupled to power status line 112, a reference signal generator 115 having a reference signal line 115A coupled to signal comparator 114, and a storage element 117 having a signal input line 117A coupled to signal comparator 114. Signal comparator 114 drives a binary signal V117A (FIG. 2C) active when the signal V112 on line 112 indicates that current Ibleed exceeds a reference signal. In one embodiment, signal comparator 114 compares a current created by signal V112 with a reference current supplied by reference signal generator 115 on line 115A. In an alternative embodiment, signal comparator 114 may compare the voltage of signal V112 with a reference voltage on line 115A.

Figure 2B:
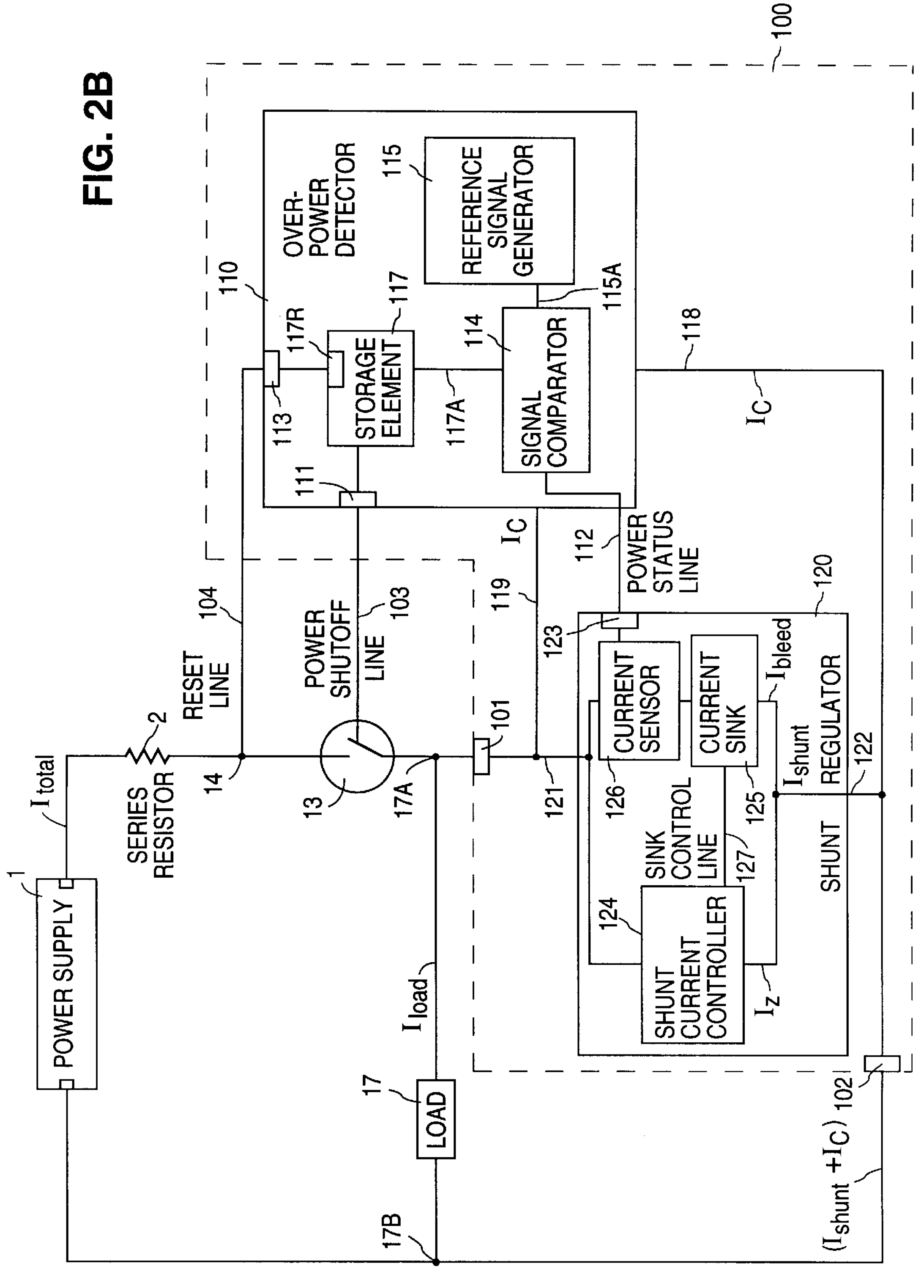
Figure 2C:
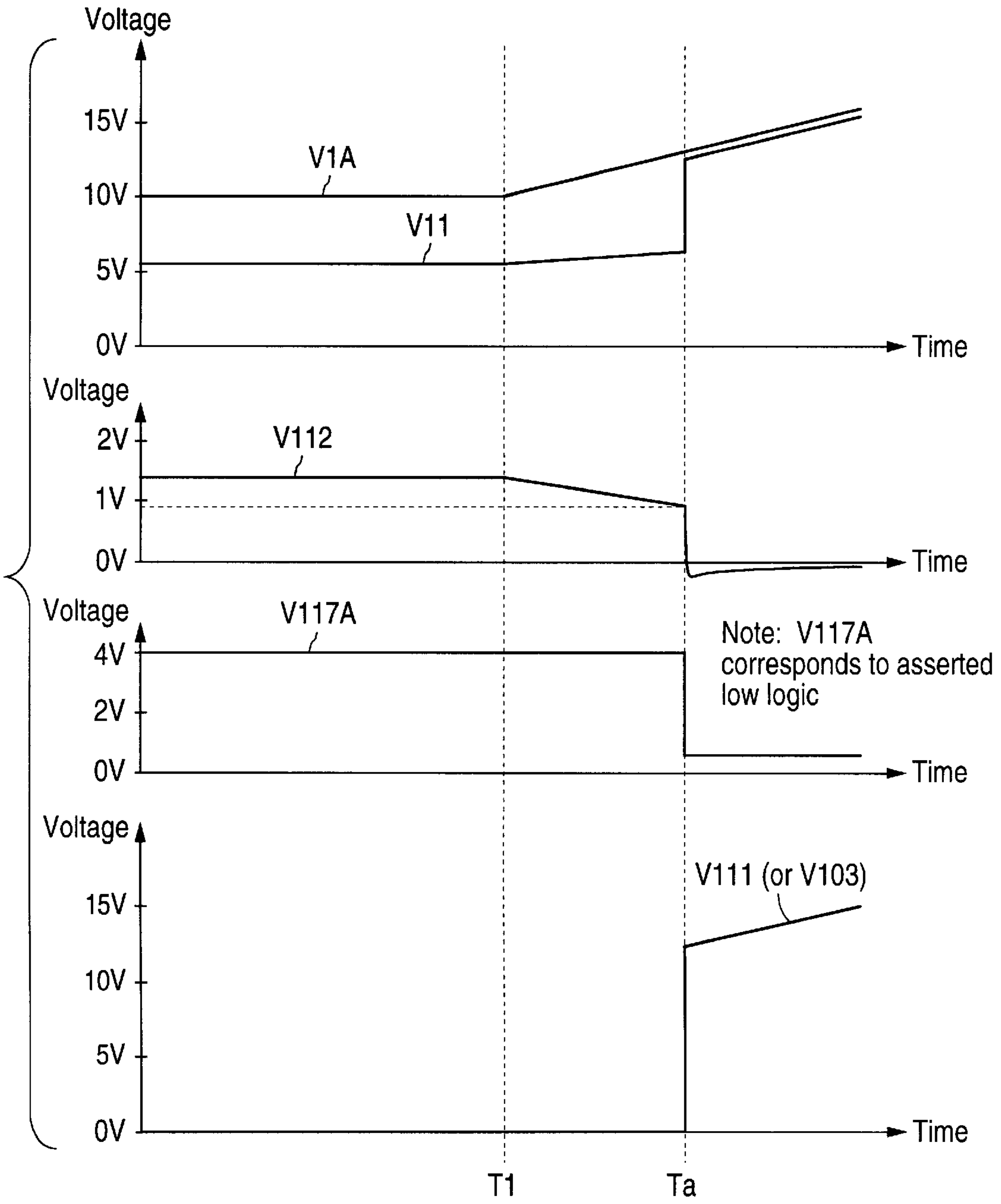
FIG. 2C illustrates, in timing diagrams, certain signals generated during the operation of the circuit illustrated in FIGS. 2A and 2B.

Specifically, in an example illustrated in FIG. 2C, the voltage of signal V112 falls below a predetermined voltage (also called "threshold voltage") of 0.9 volts at time Ta, and signal comparator 114 (FIG. 2B) drives signal V117A active (e.g. to logical level 0) at time Ta (FIG. 2C). In the above-described example, overpower detector 110 does not compare the voltage of signal V112 directly with a reference voltage, and instead compares a current created by signal V112 with a reference current.

Storage element 117 (FIG. 2B) is coupled to power shutoff terminal 111, and in response to the active state of signal V117A (in this example the voltage at logic level 0) on line 117A, storage element 117 stores the active state. Storage element 117 supplies the stored state on power shutoff terminal 111 (FIG. 2B), e.g. drives signal V111 active (e.g. to logic level 1) starting at time Ta (FIG. 2C). Signal V111 becomes active (reaches logic level 1) at time Ta and in response, protection switch 13 (FIG. 2C) opens at time Ta (as described above in reference to FIGS. 1A and 1B).

Storage element 117 has a reset terminal 117R (FIG. 2B) that is coupled to reset terminal 113 of overpower detector 110. When the voltage of signal V1A falls below the predetermined value (at time T6 in FIG. 1B), storage element 117 (FIG. 2B) is reset, and therefore supplies on line 103 an inactive signal (in this example at logic level 0 as shown in FIG. 1B).

Figure 3:
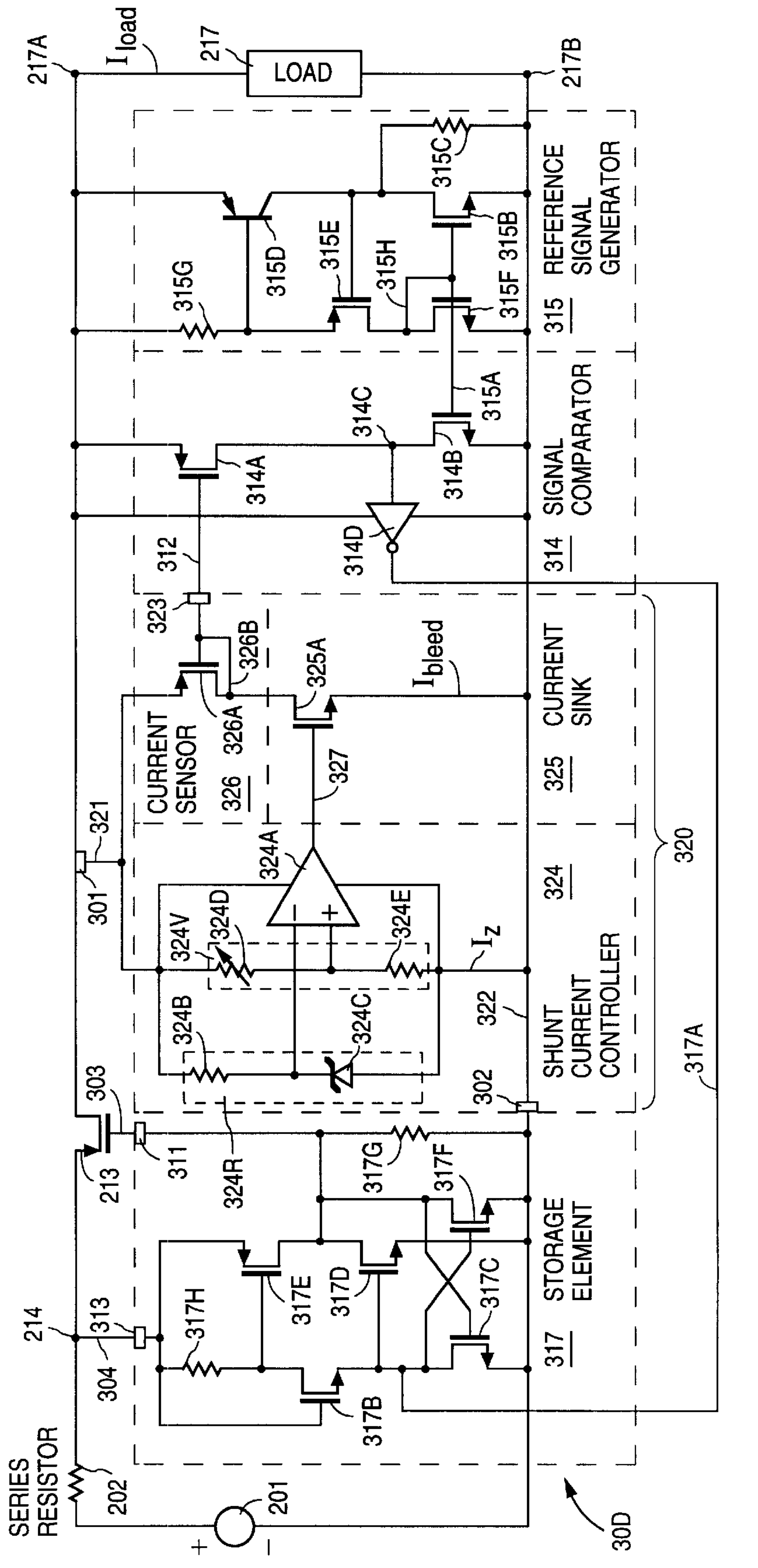
FIG. 3 illustrates, in a circuit schematic, an implementation of the circuit illustrated in FIG. 1A using discrete components.

The above-described variant of an auto-shutoff regulator 100 can be implemented as illustrated by the circuit in FIG. 3. Note that reference numerals in FIG. 3 that indicate items similar or identical to the items in FIG. 2B are obtained by adding 200 to the corresponding reference numerals in FIG. 2B.

In this particular implementation, a shunt current controller 324 (FIG. 3) includes an amplifier 324A that amplifies the voltage between the inverting and noninverting terminals (labeled "−" and "+"), and generates a signal on sink control line 327. Depending on the embodiment, amplifier 324A may be an op amp or an operational transconductance amplifier (abbreviated "OTA"). Inverting terminal "−" is coupled to a reference signal generator 324R (in one implementation formed by a resistor 324B and a Zener diode 324C), while non-inverting terminal "+" is coupled to a voltage divider 324V formed by resistors 324D and 324E. Voltage divider 324V and reference signal generator 314R are coupled in parallel between shunt input line 321 and shunt output line 322.

Note that reference signal generator 324R can be similar or identical to reference signal generator 315 described herein, except for generating a reference voltage instead of a reference current. For example, instead of zener diode 324C, any other source of reference voltage, such as a bandgap reference device can be used in reference signal generator 324R. In the above-described implementation zener diode 324C maintains a voltage of 1.2 volts at the inverting terminal "−" and therefore if the voltage at the noninverting terminal "+" exceeds 1.2 volts, opamp 324A increases the voltage on sink control line 327.

Sink control line 327 is coupled to the gate of an n-channel field effect transistor (FET) 325A that implements current sink 325, and is coupled between shunt input line 321 and shunt output line 322. Note that instead of a field effect transistor 325A, a bipolar transistor can be used. Transistor 325A operates as a linear device and controls the magnitude of current Ibleed passing therethrough, depending on the voltage on sink control line 327. Therefore, when opamp 324A increases the voltage on sink control line 327, transistor 325A increases the magnitude of current Ibleed.

In this implementation, transistor 325A has a drain coupled to the drain of a p-channel FET 326A that implements current sensor 326. Specifically, current sensor 326 includes FET 326A and a line 326B that couples the drain and the gate of FET 326A. FET 326A and line 326B together form a diode (hereinafter "status signal controlling diode") 326A in one-half of a current mirror. For clarity, the same reference numeral 326A is being used to identify both the FET and the diode formed by coupling the gate and drain of the FET. The other half of the current mirror is implemented by another p-channel FET 314A that is included in signal comparator 314 (described below).

FET 326A has a source coupled to shunt input line 321, and generates a voltage at the gate. The gate of FET 326A is coupled by status terminal 323 and power status line 312 to the gate of FET 314A in signal comparator 314. Specifically, current sensor 326 generates on status terminal 323 a voltage that is proportional to the current Ibleed, and is given by $V321-V312=\sqrt{Ibleed/K}+Vtp$ where K=transconductance factor having units of ($\mu A/V^2$), and Vtp is the threshold voltage of FET 326A.

Moreover, the voltage drop across FET 325A is substantially constant over a range of temperatures due to operation of shunt regulator 320 (FIG. 3) that maintains voltage V217A (at node 217A coupled to load 217) constant if the voltage of a signal generated by zener diode 324C is independent of temperature. Hence, the voltage on status terminal 323 is indicative of the power dissipated in current sink 325, and therefore of the power dissipated in shunt regulator 320 (as described above in reference to current Iz).

Signal comparator 314 includes FET 314A and an n-channel FET 314B. FETs 314A and 314B have drains coupled to each other and sources coupled to the respective nodes 217A and 217B. Specifically, FET 314A has a source coupled to node 217A, and a gate coupled to power status line 312. FET 314B has a source coupled to node 217B, and a gate coupled to reference signal line 315A.

Signal comparator 314 includes in one embodiment, a node 314C that is located in a path between the drains of two FETs 314A and 314B, and that is coupled to an output driver 314D that drives a binary signal on a signal input line 317A of storage element 317 (described below). Signal comparator 314 is coupled to a reference signal line 315A of reference signal generator 315, and generates a binary signal at node 314C by comparison of the relative magnitudes of the currents that would be produced by FETs 314A and 314B if their drains were not connected together. Therefore, in this embodiment, FETs 314A and 314B are both voltage controlled current sources.

If FET 314A produces a current that is greater than the current produced by FET 314B, then node 314C is pulled high (and vice-versa). The magnitude of the current produced by the respective current source is dependent on the transconductance factor K and the gate to source voltage. In one particular implementation, signal comparator 314 compares a scaled version of the current Ibleed with a scaled version of a reference current generated within reference signal generator 315 as described more completely below.

Reference signal line 315A can be coupled to any source of a reference voltage. In this particular implementation, reference signal line 315A is coupled to reference signal generator 315 that includes an n-channel FET 315B having a source coupled to node 217B, a gate coupled to reference signal line 315A, and a drain coupled to a resistor 315C that is in turn coupled to node 217B. The drain of FET 315B is coupled to a collector of pnp transistor 315D that is also included in reference signal generator 315. PNP transistor 315D has an emitter that is coupled to node 217A, and a base that is coupled to a resistor 315G that is in turn coupled to node 217A.

The base of pnp transistor 315D is coupled to the source of a p-channel FET 315E that has a gate coupled to a junction between the collector of transistor 315D and the drain of transistor 315B. Moreover, FET 315E has a drain coupled to the drain of another transistor 315F also included in reference signal generator 315. Note that the drain and the gate of transistor 315F are coupled each to the other by a line 315H thereby to form a diode (hereinafter "reference signal controlling diode") 315F in a current mirror. Therefore, reference signal generator 315 generates, through the reference signal controlling diode 315F, a current of magnitude Vbe/R, wherein Vbe is the base-emitter voltage of transistor 315D, and R is the resistance of resistor 315G.

In the specific embodiment illustrated in FIG. 3, signal comparator 314 compares a scaled version of the current flowing through status signal controlling diode 326A with a scaled version of the reference current flowing through reference signal controlling diode 315F. Therefore, when the scaled version of current flowing in controlling diode 315F is greater than the scaled version of the current flowing in controlling diode 326A, FET 314B operates to drive a binary signal at node 314C low (e.g. the voltage at node 314C to ground). When the scaled version of the current in reference signal controlling diode 315F is lower than the scaled version of the current in status signal controlling diode 326A, FET 314A operates to drive the binary signal at node 314C high, (e.g. the voltage at node 314C goes to 3 volts). The scaling of currents in FETs 326A and 315F occurs because the ratio of width to length (also called "W/L ratio") of FET 314A is scaled relative to the W/L ratio of FET 326 A. The same is true for FETs 314B and 315F.

In one particular implementation, the reference current in line 315A has a negative temperature coefficient, i.e. the current is a CTAT (abbreviation of "complimentary to absolute temperature") current of the type described in, for example, in "A Temperature Sensor with Single Resistor Set Point Programming" by A. Paul Brokaw, IEEE Journal of Solid-State Circuits, Vol. 31, No. 12, December 1996 that is incorporated by reference herein in its entirety.

Figure 4A:
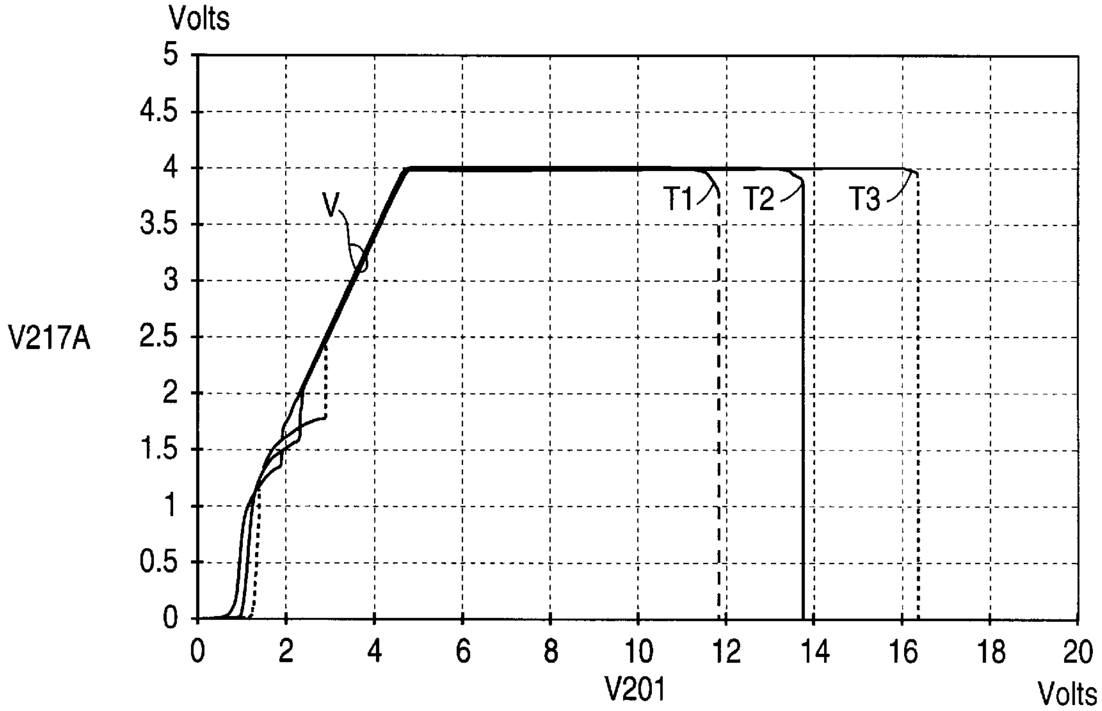
FIGS. 4A and 4B illustrate, in two graphs respectively, the regulated voltage from and the power dissipation in the auto-shutoff regulator of FIG. 3.
Figure 4B:
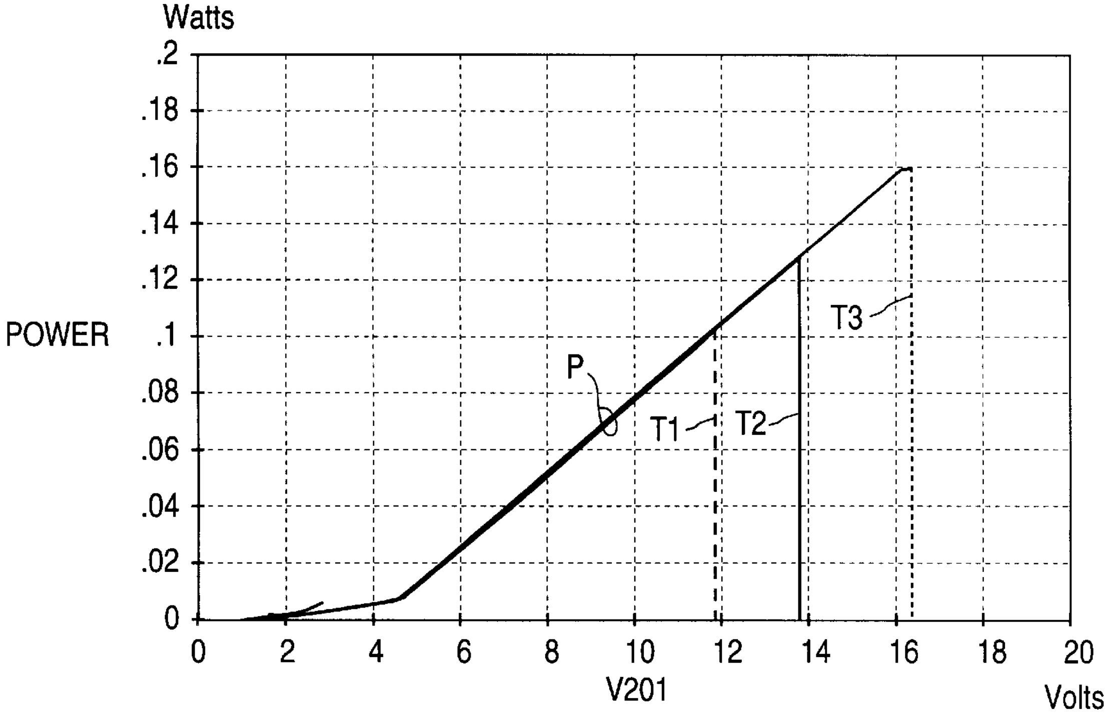

When the ambient temperature increases beyond a predetermined temperature for which circuit 300 was designed, the CTAT current causes comparator 314 to drive a signal on line 317A active (in this particular implementation an active high signal), thereby to shut off protection switch 213 at a lower value of dissipated power. Therefore, the just-described shutoff at the lower value keeps the temperature of circuit 300 below a maximum-rated temperature of the device that implements circuit 300. Operation of circuit 300 at three different ambient temperatures T1, T2 and T3 is illustrated in FIGS. 4A and 4B and described below.

Depending on the embodiment, instead of generating a CTAT current, reference signal generator 315 can generate a current that has a positive temperature coefficient (also referred to as "PTAT current" wherein PTAT is an abbreviation for "Proportional To Absolute Temperature"), or a very low temperature coefficient (e.g. less than one percent variability with ambient temperature) such as a current provided by a device based on the bandgap voltage of silicon. In such alternative embodiments (that use a PTAT current or a bandgap device), a signal comparator 314 can be appropriately modified, if required by a specific implementation, to perform the above-described act of shutting off at lower value of dissipated power when the ambient temperature is higher than the predetermined temperature.

Referring to FIG. 3, signal input line 317A is coupled to a storage element implemented by a latch 317 that in turn is coupled by power shutoff terminal 311 and power shutoff line 303 to the gate of protection switch 213. Specifically, signal input line 317A is coupled to the source of n-channel FET 317B that has a gate coupled to reset terminal 313. Signal input line 317A is also coupled to the drain of FET 317C that is also included in storage element 317. The source of FET 317C is coupled to terminal 302 that is in turn coupled to power supply 201. The gate of FET 317C is coupled to terminal 311. Moreover, signal input line 317A is coupled to the gate of another n-channel FET 317D included in storage element 317. FET 317D has a drain coupled to power shutoff terminal 311, and a source coupled to terminal 302.

Power shutoff terminal 311 is also coupled to the drain of p-channel FET 317E also included in storage element 317. FET 317E has the source coupled to reset terminal 313 and the gate coupled to a resistor 317H that is in turn coupled to reset terminal 313. The gate of FET 317E is also coupled to the drain of FET 317B (described above).

As described above, when the scaled version of the reference current passing through FET 315F becomes greater than the scaled version of current Ibleed passing through FET 326A, node 314C is pulled low by FET 314B, and inverting buffer 314D drives a signal V117A active (in this example an active high signal) on line 317A that turns on FET 317D. Therefore, terminal 311 is pulled low by FET 317D, thereby to ensure that switch 213 stays on. As the voltage provided by source 201 continues to increase, the scaled version of current Ibleed increases to a point where it exceeds the scaled version of the reference current passing through transistor 315F, and node 314C is pulled high by FET 314A. Therefore, buffer 314D drives a signal on line 317A inactive (e.g. low), causing storage element 317 to be set.

Specifically, the low signal on line 317A turns off FET 317D and turns on FET 317E, thereby pulling the terminal 311 high, and turning off FET 213. When FET 213 turns off, voltage 217A collapses to ground. Moreover, the voltage at node 214 rises to the supply voltage provided by source 201 (if the resistance of resistor 317H is much greater than the resistance of resistor 202), and storage element 317 remains set until the voltage supplied by source 201 drops below a value that causes FET 213 to begin to turn on.

The component ratings for a discrete implementation of auto-shutoff regulator 300 (FIG. 3) are provided in Table 1 below. Note that regulator 300 can also be implemented in an integrated circuit die, as described below in reference to FIGS. 5A–5B.

TABLE 1

| Reference Numeral in. FIG. 3 | Component Rating |
|---|---|
| 201 | 0–20 volt power supply |
| 202 | 300 ohms |
| 317H | 100K ohms |
| 324B | 33K ohms |
| 324B | 50K ohms potentiometer |
| 324E | 10K ohms |
| 315G | 1K ohms |
| 315C | 1 meg ohm |
| 317B | ZVN4301A |
| 317C, 317F, 314B, 315F, 315B, 317D | ZVNL110 |
| 317E | ZVP4105 (two) |
| 213 | ZVP4105 (three) |
| 324C | LM385 (1.2 volt) |
| 324A | LM7301 |
| 326A | ZVP4105 |
| 325A | ZVNL110 (three) |
| 314D | 74HC04 |
| 314A | ZVP0545 |
| 315E | ZVP4105 |
| 315B | 2N3906 |
| 315C | 1 meg ohm |

Each of the above-described components in Table 1 is available from any supplier of electronic components, such as Digi-Key Corporation, 701 Brooks Ave. South, Thief River Falls, Minn. 56701, Phone 1-800-344-4539, fax 1-218-681-3380 and Email volume@digikey.com; see the Web page at www.digikey.com for further information.

Therefore, auto-shutoff regulator 300 regulates voltage V217A (provided at node 217A to load 217 in FIG. 3), and the power dissipated, as the respective functions "V" and "P" (FIGS. 4A and 4B) of the voltage V201 from power source 201. Node 201 is coupled to power supply 201 by series resistor 202 and FET 213 that steps down the voltage provided by power supply 201 from 12 volts to 4 volts. As the voltage provided by power supply 201 increases, voltage V (FIG. 4A) and power P (FIG. 4B) increase proportionately, until voltage from power supply 201 reaches 4.8 volts.

Thereafter, as the voltage from power supply 201 increases further, auto-shutoff regulator 300 maintains voltage V (FIG. 4A) constant, at the 4 volts in this example, until the dissipated power P (FIG. 4B) exceeds a predetermined threshold. Specifically, as the voltage from power supply 201 increases beyond 4.8 volts, bleed current controller 324 (FIG. 3) causes FET 325A to increase the magnitude of current Ibleed passing therethrough (until signal comparator 314 drives the binary signal active on line 317A thereby to open FET 213). As the voltage across FET 325A is constant (e.g. constant to within 10% depending on the process used to form FET 325A), specifically one Vsg (source-gate voltage, e.g. one diode drop) below output voltage V217A, the power dissipation in FET 325A is proportional to current Ibleed that is sensed by current sensor 326.

Therefore, on exceeding the threshold, auto-shutoff regulator 300 opens switch 213 thereby to cause voltage V (FIG. 4A) and power P (FIG. 4B) to drop to 0. Such opening of switch 213 causes Ibleed passing through FET 325A (FIG. 3) to fall to zero, thereby preventing overpower operation (e.g. operation dissipating several times the power normally dissipated, such as five or ten times normal power) of any devices (e.g. FETs) and the resulting damage that may be caused by hot electron degradation.

The overpower operation includes typical Class AB operation of a device (FET), wherein the device that has a substantial current (several times the normal current) passing through it, as well as a substantial voltage (several times the normal voltage) across it. In one situation, during Class AB operation the device is dissipating substantial power (product of substantial current and substantial voltage) that is sufficient to physically damage the device. In one example, the just-described opening of switch 213 occurs at voltage V201 of 11.9 volts at ambient temperature T1 of 75° C. In this example, a similar behavior occurs at lower ambient temperatures, e.g. at temperature T2 of 25° C. and at temperature T3 of −30° C., except that the maximum voltage tolerated by auto-shutoff regulator 300 is respectively 13.9 volts and 16.4 volts.

The opening of switch 213 at different levels in the voltage provided by power supply 201 (FIG. 3) in response to different ambient temperatures Ta as described herein is a critical aspect in one embodiment of the invention. Note that die temperature Tj at the shutdown point increases (e.g. by 5° C.) as the ambient temperature Ta increases (e.g. by 10° C.), but at a slower rate. Therefore, the rate of change of the die temperature Tj at the shutdown point is less than the rate of change of the ambient temperature Ta. In one example, Ta is 25° C., current die temperature Tj is 50° C. and switch 213 operates when temperature Tj reaches 55° C. In this example, if Ta increases to 35° C., then switch 213 operates at 60° C., which approaches the goal of switch 213 operating ideally when temperature Tj reaches 55° C.

Figures 5, 5A:
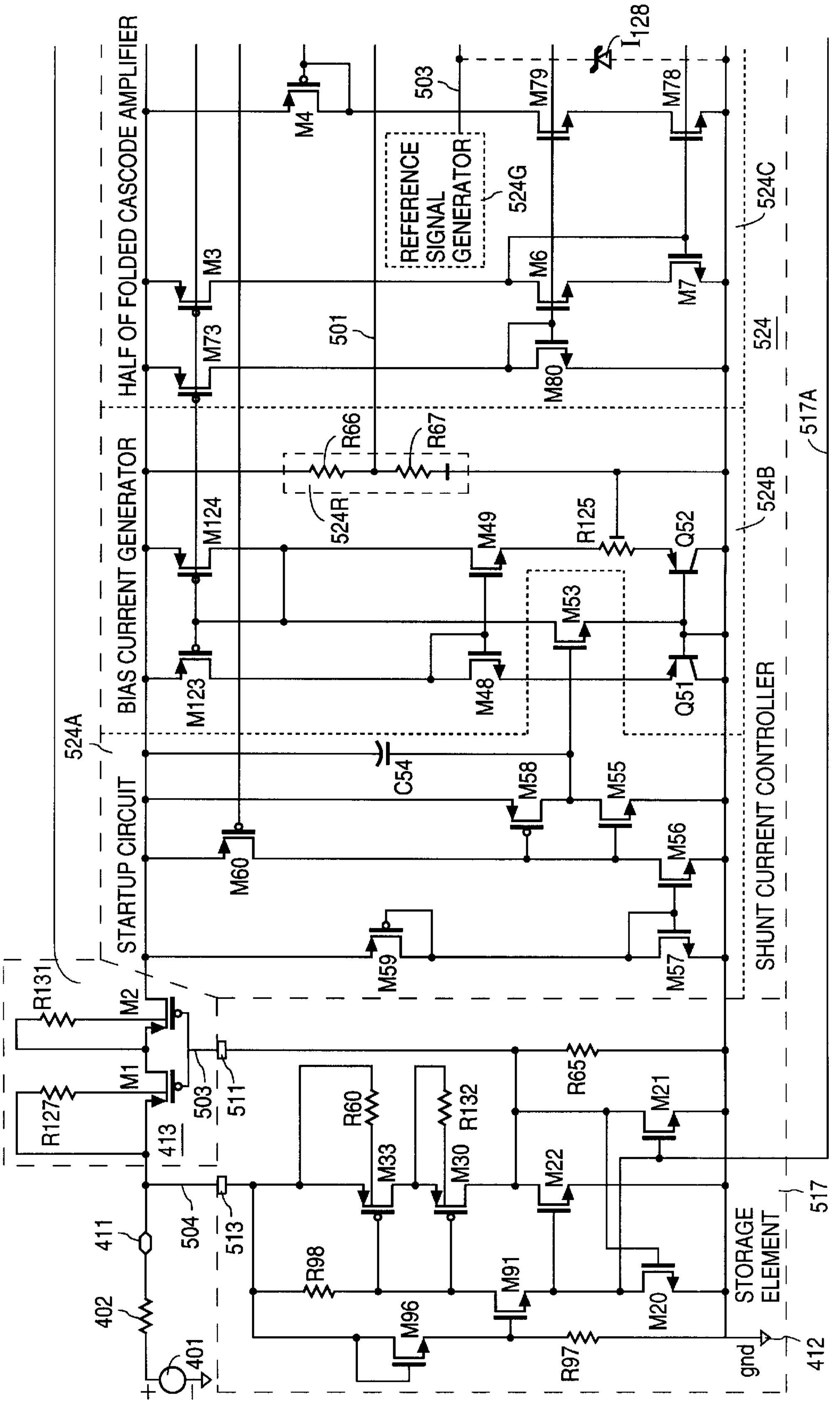
FIG. 5 (including FIGS. 5A and 5B) illustrates, in a circuit schematic, an implementation of the circuit illustrated in FIG. 1A in an integrated circuit die.
Figure 5B:
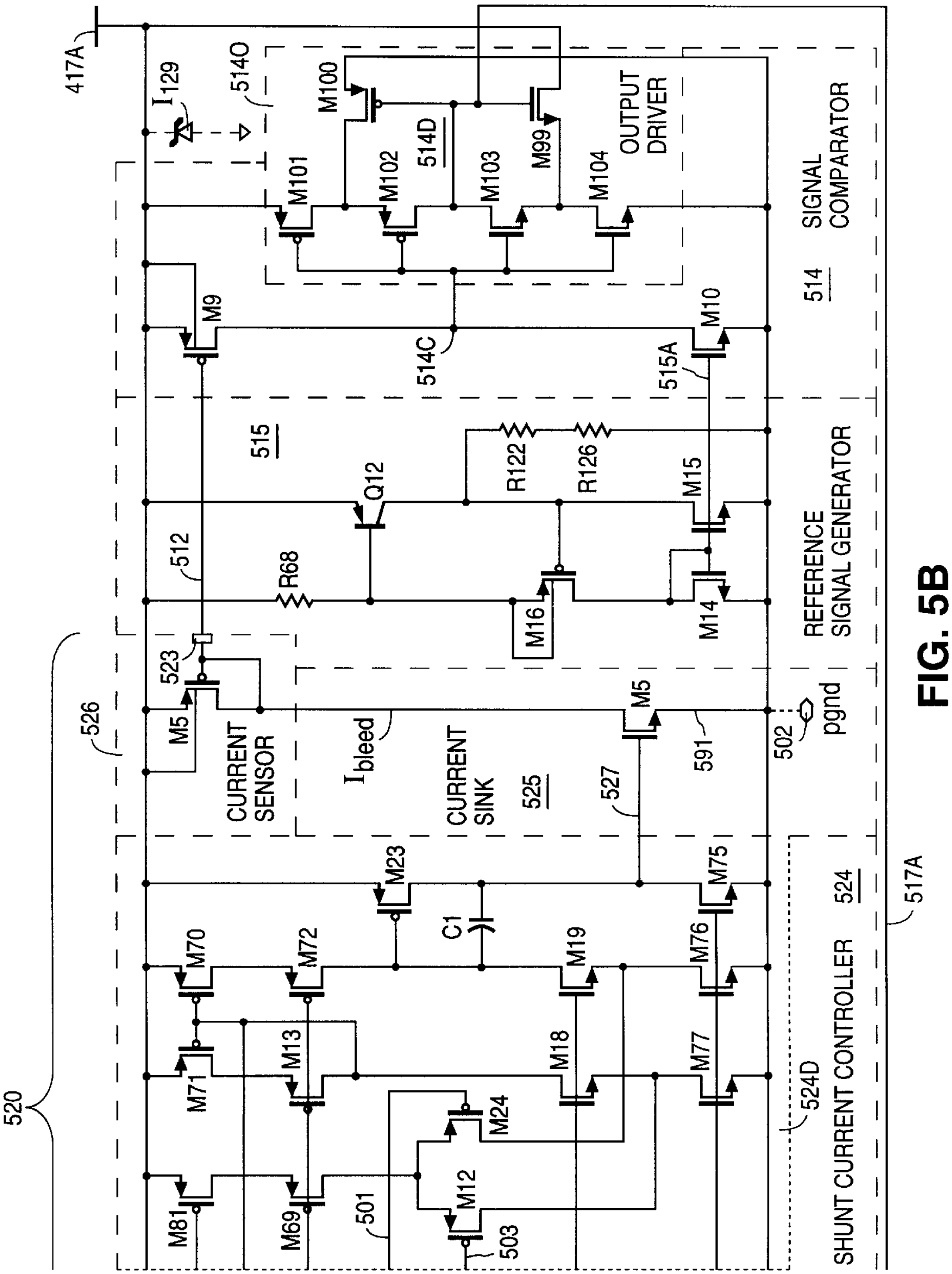

Although in one implementation, auto-shutoff regulator 300 is built of discrete components (as illustrated in Table 1 above), any one or more of the components can be implemented in an integrated circuit die. For example, all parts other than resistor 2 and power supply 1 can be included in an integrated circuit die 10 (FIG. 1A). In one such implementation, an auto-shutoff regulator 500 (FIGS. 5A and 5B) is formed in an integrated circuit die. In FIGS. 5A and 5B, reference numerals that indicate similar or identical components to those described above in reference to FIG. 2B are derived by adding 400 to the corresponding reference numerals.

Specifically, a shunt regulator 520 (FIGS. 5A and 5B) includes a shunt current controller 524, a current sink 525 and a current sensor 526. Moreover, an overpower detector (not labeled) of circuit 500 includes a signal comparator 514, a reference signal generator 515 and a storage element 517. Each of these parts of auto-shutoff regulator 500 behave in a manner similar or identical to the above-described behavior of corresponding parts of auto-shutoff regulator 300 (FIG. 3), except for the differences as described below.

Storage element 517 (FIG. 5A) can be any storage element known to the skilled electrical engineer. In one implementation, storage element 517 includes an n-channel FET M96 having a gate coupled to the drain that in turn is coupled to terminal 411. The source of FET M96 is coupled through a resistor R97 to terminal 412. Moreover, the source of FET M96 is coupled to the gate of another n-channel FET M91 that has a drain coupled through resistor R98 to terminal 411.

Terminal 411 is coupled, through a resistor 402 to a positive terminal of power supply 401 that may be an unregulated power supply outside of the IC die. The drain of FET M91 is also coupled to the gates of p-channel FETs M33 and M30 that are coupled in series with an n-channel FET M22 between terminals 411 and 412. The gate of FET M22 is coupled to the source of FET M91. Moreover, the drain of FET M22 is coupled to terminal 511 that is in turn coupled by power shut off line 503 to the gates of each of p-channel FETs M1 and M2 that are included in protection switch 413.

Note that the resistance values of resistors R97, R98 and R65 will be apparent to the skilled electrical engineer in view of the disclosure. The specific values of these resistors R97, R98 and R65 depend on several factors such as (1) the characteristics of the FETs, (2) CMOS process being used, (3) the desired level to which voltage V401 must fall before protection switch 415 (FIG. 5A) turns back on once it has been turned off (open). In one example, resistors R97, R98 and R65 have the values 100 Kohms, 60 Kohms and 100 Kohms respectively, for a 0.72 micron CMOS process.

Initially, when power is turned on, FET M91 is off, and the gates of FETs M33 and M30 are pulled high by resistor R98. At this time, FETs M1 and M2 in protection switch 413 are on, because terminal 511 and line 503 carry an inactive signal provided by storage element 517. Therefore, protection switch 413 is closed, and the voltage at terminal 411 is made available at terminal 417A (FIG. 5B)

Shunt current controller 524 includes a startup circuit 524A, a bias current generator 524B, and a cascode amplifier formed by circuits 524C and 524D. Bias current generator 524B includes a voltage divider 524R formed by resistors R66 and R67 that provide a voltage on a common line 501 to a portion of cascode amplifier formed by circuit 524D in a manner similar to that described above for voltage divider 324V in reference to FIG. 3. Therefore, shunt current controller 524 becomes balanced when $$Vdd=V\text{ref}\cdot(1+R66/R67).$$

Specifically, as illustrated in FIG. 5A, resistor R66 has one end coupled to node 417A (FIG. 5B). Node 417A acts as a source of output voltage Vdd, while resistor R67 has one end coupled to the source of the ground reference voltage. Bias current generator 524B also includes, in addition to voltage divider 524R, PNP transistors Q51 and Q52 that have the bases coupled each to the other, and collectors coupled to the source of the ground reference voltage. The emitters of transistors Q51 and Q52 are respectively coupled to the sources of FETs M48 and M49. Specifically, the source of FET M49 is coupled through a transistor R25 to the emitter of transistor Q52.

Moreover, the gates of FETs M48 and M49 are coupled each to the other. Also, the gate of FET M48 is coupled to the drain, thereby to form a diode of FET M48 in the manner described herein. The drains of FETs M48 and M49 are respectively coupled to the drains of FETs M123 and M124. FETs M123 and M124 have the gates coupled each to the other, and have sources coupled to node 417A. Also, the gate of FET M124 is coupled to the drain thereby to form a diode as described herein. Moreover, the gates of FETs M123 and M124 are coupled to the drain of FET M53 that is included in start up circuit 524A.

FET M53 also has the source coupled to the bases of transistors Q51 and Q52 (on ground node 412), and a gate coupled to node 417A through a capacitor C54. The gate of FET M53 is also coupled to the drains of P-channel FET M58 and n-channel FET M55. The sources of FETs M55 and M58 are respectively coupled to ground (node 412) and node 417A. The gate of FET M58 is coupled to the drain of p-channel FET M60 that has the source coupled to node 417A. The gate of FET M60 is coupled to the gates of FETs M70 and M71 and the drains of FET M13 in the cascode amplifier as discussed below. The drain of FET M60 is also coupled to the gate of FET M55 and the drain of n-channel FET M56.

The source of FET M56 is coupled to ground (e.g. at node 412), while the gate is coupled to the gate of n-channel FET M57. N-Channel FET M57 also has the gate coupled to the drain, thereby to form a diode as described herein. The source of FET M57 is coupled to the source of the ground reference voltage (e.g. terminal 412). The drain of FET M57 is coupled to the drain of P-channel FET M59.

FET M59 has the gate coupled to the drain, and therefore also acts as a diode. The source of FET M59 is coupled to node 417A. Note that the ratings of the various components in startup circuit 524A and bias current generator 524B, namely the capacitance of capacitor C54, the resistance of resistor R125, R66 and R67 depends on the implementation, and will be apparent to the skilled electrical engineer in view of the disclosure. In one example, Vdd is 4 volts, Vref is 1.2 volts, resistors R125, R66 and R67 have the values 12 Kohms, 23.3 Kohms and 10 kohms for 0.72 micron CMOS process.

Shunt current controller also includes a reference signal generator 524G (FIG. 5A) that can be formed of a zener diode and a resistor similar to reference signal generator 324R described above in reference to FIG. 3. In addition to the reference signal generator 524G, shunt current controller 524 also includes a folded cascode amplifier formed by circuits (also called "half-amplifier") 524C and 524D that each form one half of the cascode amplifier as illustrated in FIGS. 5A and 5B. Half-amplifier 524C includes n-channel FET M80 having the gate coupled to the drain, and therefore acts as a diode. The drain of FET M80 is coupled to the drain of p-channel FET M73 that has the source coupled to node 417A. FET M73 has the gate coupled to the drain of FET M53 in startup circuit 524A. FET M80 has the source coupled to the source of the ground reference voltage (e.g. node 412).

Half-amplifier 524C also includes n-channel FET M6 having the drain coupled to the drain of p-channel FET M3 that in turn has the source coupled to node 417A. FET M3 also has the gate coupled to the drain of FET M53. FET M6 has the source coupled to the drain of n-channel FET M7 that in turn has the source coupled to node 412. FET M7 has the gate coupled to the gate of another n-channel FET M78. FET M78 has the source coupled to node 412 and the drain coupled to the source of another n-channel FET M79. FET M79 has the gate coupled also to the gate of FET M6. Moreover, FET M79 has the drain coupled to the drain of p-channel FET M4 that in turn has the source coupled to node 417A.

FET M4 also has the gate coupled to the drain, thereby to act as a diode as described herein. The gate of FET M4 is coupled to the gate of p-channel FET M69 in the other half of folded cast code amplifier 524B (FIG. 5B). FET M69 has the source coupled to the drain of FET M81 that in turns has the source coupled to node 417A. The gate of FET M81 is coupled to the drain of FET M53 of startup circuit 524A. The drain of FET M69 is coupled to source of p-channel FET M12 that in turn has the gate coupled to line 503 of reference signal generator 524G.

FET M12 has the drain coupled to the drain of n-channel FET M77 that in turn has the source coupled to node 412. The source of FET M12 is coupled to the source of p-channel FET M24 that in turn has the gate coupled to line 501 of voltage divider 524R. FET M24 also has the drain coupled to the drain of FET M76 that in turn has the source coupled to node 412 and the gate coupled to the gates of FETs M77, M78 and M7. The drain of FET M77 is coupled to the source of FET M18 that in turn has the drain coupled to the drain of p-channel FET M13.

FET M13 also has the drain coupled to the gate of FET M60 in startup circuit 524A. FET M13 has the gate coupled to the gates of FETs M69 and M4 described above. Moreover, FET M13 has the source coupled to the drain of p-channel FET M71. FET M71 has the source coupled to node 417A and the gate coupled through an inverting buffer to the gate of FET M60. The drain of FET M76 is also coupled to the source of n-channel FET M19 that has the drain coupled to the drain of p-channel FET M72.

The gate of FET M72 is coupled to the gates of FETs M13, M69 and M4. The source of FET M72 is coupled to the drain of p-channel FET M70 that in turn has the source coupled to node 417A. The gate of FET M70 is coupled to the gates of FETs M71 and M60. The drains of FETs M72 and M19 are coupled through a capacitor C1 to the drain of p-channel FET M23 that has the source coupled to node 417A. FET M23 has the gate coupled to the drains of FETs M72 and M19. The drain of FET M23 is also coupled to the drain of n-channel FET M75 that in turn has the source coupled to node 412, and the gate coupled to gates of FETs M76, M77, M78 and M7. The drains of FETs M23 and M75 are also coupled to a line 527 that carries a signal similar to the signal carried by line 327 described above in reference to FIG. 3.

Instead of using a zener diode 324C as described above in reference to FIG. 3, a bandgap device formed by the base-emitter junctions of two diodes having different current densities can be used to generate the reference voltage in shunt regulator 120. Although voltage vref_in (FIG. 5A) used by shunt current controller 524 can be provided by an internal device, such as a bandgap device in the IC die, in another embodiment such a voltage is generated by an external source in a manner well-known in the art of electrical engineering.

In such an external reference implementation, line 503 is coupled to ground through a zener diode 1128 thereby to protect the circuitry in the IC die from an electrostatic discharge (abbreviated as "ESD") condition. Similarly, another zener diode 1129 (FIG. 5B) can be included to couple terminal 417A to ground and also to protect from and ESD condition.

In the implementation illustrated in FIGS. 5A and 5B, a current sink 525 is formed by an n-channel FET M5 that has the gate coupled to line 527 from the cascode amplifier and the source coupled to node 412 (FIG. 5A). Node 412 is connected to a source of the ground reference voltage. If necessary, instead of coupling the source of FET M5 to node 412 (that is also coupled to other FETs, e.g. FETs M20 and M21 in storage element 517, and FETs M56 and M57 in shunt regulator 524), the source of FET M5 can be coupled to another bond pad 502 to avoid any problems caused by parasitic resistance of line 591 (FIG. 5B), as will be apparent to the skilled electrical engineer in view of the description herein.

Moreover, in one implementation, current sensor 526 includes a p-channel FET M8 having the drain coupled to the gate, thereby to function as a diode as described above. Also, reference signal generator 515 includes a number of FETs M14–M16 (wherein FET M14 has the drain connected to gate and functions as a diode), resistors R122 and R126 connected in series (that may be combined into a single resistor) and pnp transistor Q12.

Transistor Q12 has an emitter coupled to node 417A, the base coupled to one end of resistor R68 that has the other end coupled to node 417A, and the collector coupled to one end of resistor R122 that is coupled through resistor R126 to a source of the ground reference voltage. The collector of transistor Q12 is also coupled to the gate of FET M16 that has the drain coupled to the drain of FET M14.

FET M16 has the source coupled to the base of transistor Q12, while the gate of FET M14 is coupled to the gate of FET M15. FET M15 has the drain coupled to the collector of transistor Q12, and the source coupled to the source of ground reference voltage. A node coupled to the two gates of FETs M14 and M15 is also coupled to the gate of FET M10 in signal comparator 514.

Signal comparator 514 includes FET M10 and FET M9 that have the drains coupled each to the other. The source of FET M9 is coupled to node 417A and the source of FET M10 is coupled to a source of the ground reference voltage. FET M9 has the body also coupled to node 417A. In addition to FETs M9 and M10, signal comparator 514 includes output driver 5140 that is coupled to a node 514C between the drains of FETs M9 and M10. In one particular implementation, illustrated in FIG. 5B, output driver 5140 is implemented as a Schmidt trigger to provide hysteresis that prevents the possibility of undesired oscillations of the type well known to the skilled electrical engineer.

As illustrated in FIG. SB, in this particular implementation, output driver 5140 includes FETs M102 and M103 that have the drains each coupled to the other, and to the gates of FETs M100 and M99 also included in output driver 5140. Each of FETs M102 and M103 has a gate coupled to node 514C. Node 514C is also coupled to the gates of FETs M101 and M104. The sources of FETs M101 and M104 are respectively coupled to the source of high reference voltage (e.g. via node 417A) and to ground. A node between the drain of FET M101 and the source of FET M102 is coupled to the drain of FET M100. Similarly, a node between the source of FET M103 and the drain of FET M104 is coupled to the source of FET M99.

The source of FET M100 and the drain of FET M99 are respectively coupled (e.g. via nodes 412 and 417A) to the source of the ground reference voltage and the high reference voltage. A node between the gates of FETs M100 and M99 that is also coupled between the drains of FETs M102 and M103 is coupled to line 517A that carries the binary signal.

One or more of the resistors and capacitors illustrated in FIGS. 5A and 5B may be implemented as thin film resistors or alternatively as diffused resistors that have well connections (not shown) of the type well known to the skilled electrical engineer in view of the description. In one such embodiment, integrated circuit die 10 is formed by a 0.7 $\mu$m complementary metal oxide semiconductor (CMOS) process.

Figure 6:
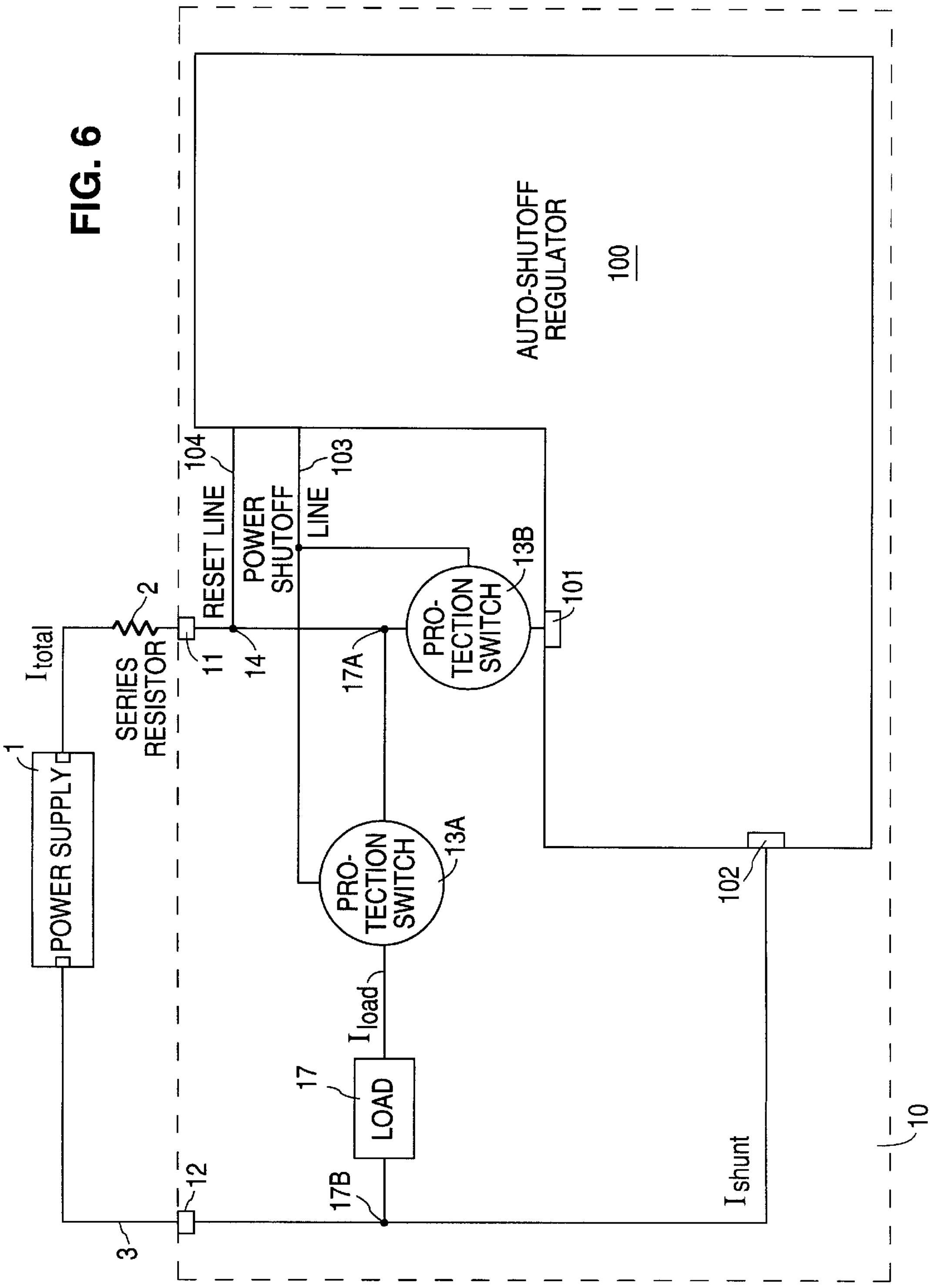
FIG. 6 illustrates an alternative embodiment of coupling an auto-shutoff regulator to two protection switches.

Numerous modifications and adaptations of the embodiments and implementations described herein would be apparent to a person skilled in electrical engineering in view of the disclosure. For example, instead of using field effect transistors (FETs), bipolar transistors can also be used to perform one or more of the functions described herein. Moreover, instead of having protection switch 13 (FIG. 1A) in series with power supply 1, two protection switches 13A and 13B can be coupled, one in series with load 17 and another in series with auto-shutoff regulator 100, wherein power shutoff line 103 is coupled to each of protection switches 13A and 13B as illustrated in FIG. 6.

Also, in another embodiment, instead of having a current sensor 126 (FIG. 2B) that monitors the current Ibleed, a sensor in shunt current controller 124 is coupled directly to status terminal 123, and provides thereon a signal similar to the signal on sink control line 127 thereby to indicate the power dissipated in current sink 125. This is possible if the magnitude of the voltage on line 127 is used to determine the magnitude of the current Ibleed.

Figure 7:
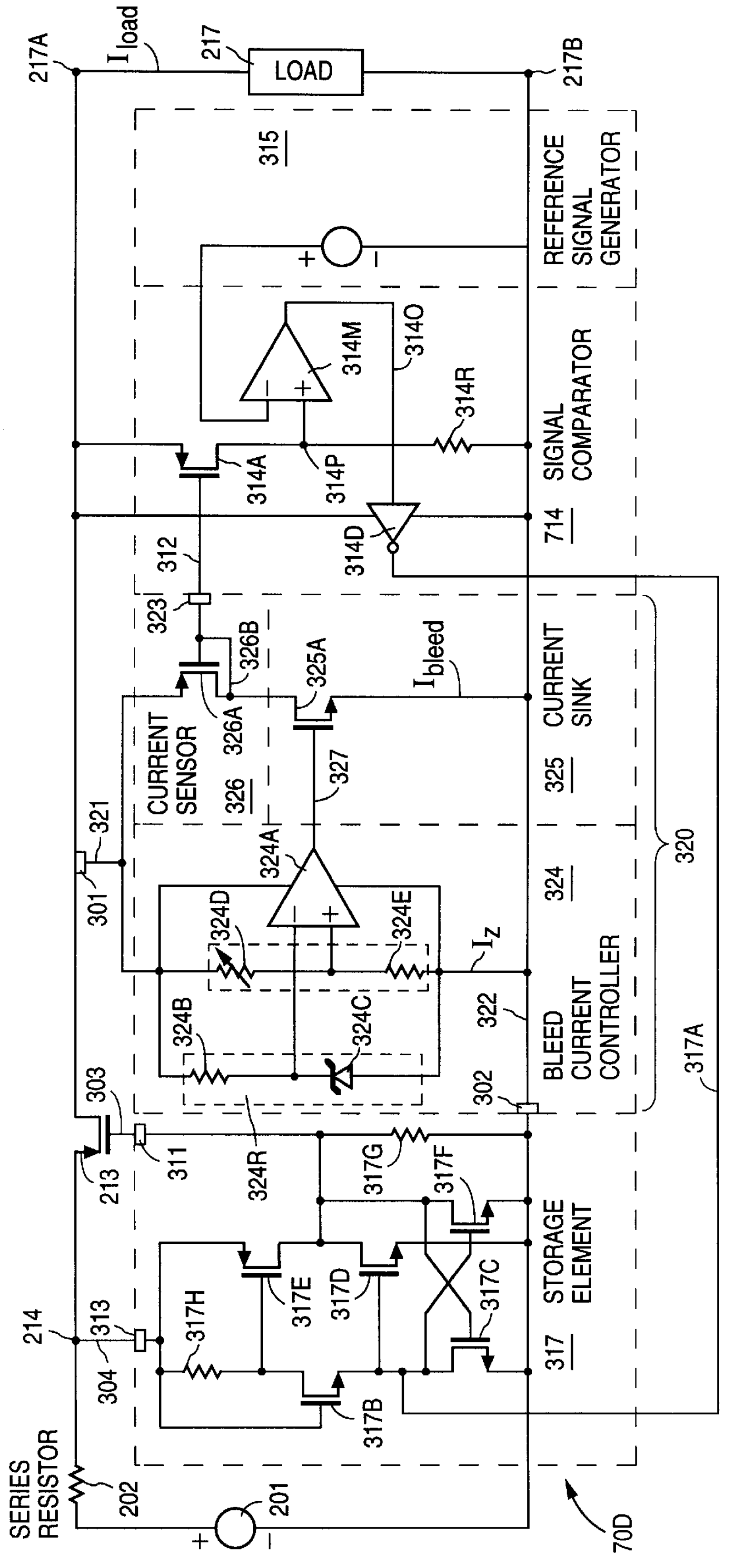
FIG. 7 illustrates an alternative implementation for generating a reference signal in the overpower detector of FIG. 2B.

Furthermore, in another embodiment, instead of signal comparators 314 (FIG. 3) and 514 (FIG. 5B) being implemented as current comparators, in another embodiment, a signal comparator 114 (FIG. 2B) is implemented as a voltage comparator. Therefore, in one such embodiment regulator 700 (FIG. 7) is substantially identical to regulator 300 described above in reference to FIG. 3, except for the following differences. Specifically, signal comparator 714 includes a resistor 314R that has one end coupled to the drain of FET 314A (described above in reference to FIG. 3). FET 314A also reflects the current from diode 326A as discussed above in reference to FIG. 3.

The just-described current flows through resistor 314R, and thereby provides at node 314P (between drain of FET 314A and resistor 314R) a voltage that is proportional to the resistance of resistor 314R. Signal comparator 714 also includes a comparator 314M that has a noninverting terminal coupled to node 314P. However, if the input terminals of comparator 314M are switched, then inverting buffer 314D is not needed. The inverting terminal of comparator 314M is coupled to a reference signal generator 315 of the type described above in reference to FIG. 3, or based on the bandgap voltage of the semiconductor material, or based on a zener diode as described herein.

Therefore, comparator 314M compares the voltage at node 314P with the voltage generated by reference signal generator 315. Whenever the voltage at node 314P exceeds the reference voltage from generator 315, comparator 314M drives a signal active (e.g. high) on output line 3140 that is coupled to inverting buffer 314D. Buffer 314D in turn drives a signal active on line 317A (as described above, e.g. a low signal), thereby causing storage element 317 to be set and operating as described above in reference to FIG. 3.

In such an alternative embodiment, FETs M8 and M9 (in current sensor 526 and in signal comparator 514 in FIG. SB) are still used to mirror and scale the current in FET M5 (in current sink 525), and resistor (not shown) is coupled between the drain of FET M9 and the ground. The voltage across this resistor is proportional to the current in FET M5, and this voltage is compared to a reference voltage that is complementary to the absolute temperature (such as a base emitter voltage Vbe) by a two input comparator with hysteresis (also not shown). Such a voltage comparator performs the same function as the current comparator described herein for implementing signal comparator 114, and therefore can be used to implement an auto-shutoff regulator as described herein.

Moreover, a reference signal generator 115 (FIG. 2B) can be implemented to generate either a reference voltage or a reference current that is proportional to the absolute temperature, or has a zero temperature coefficient in a manner well known to the electrical engineer. For examples of various types of reference signal generators, see the books "Analysis and Design of Analog Integrated Circuits," by Paul Gray and Robert Meyer, John Wiley & Sons, New York, 1984, and "Bipolar and MOS Analog Integrated Circuit Design," by Alan Grebene, John Wiley & Sons, New York, 1984.

The die temperature Tj at which protection switch 13 (FIG. 2A) is triggered is predetermined based on the amount of power dissipated in load 17, the voltage provided by power supply 1, and the resistance of series resistor 2, assuming that the thermal resistance of a package that supports the die is known, by using the following equations, wherein various parameters are as shown in Table 2 below.

TABLE 2

| Parameter | Description |
|---|---|
| Tj | Junction temperature (also called "die temperature") of the silicon of the IC at the time protection switch 13 is opened |
| Ta | Ambient temperature |
| Tnom | Nominal temperature (i.e., 27° C.) |
| Pmax | Maximum power to be dissipated in shunt regulator 120 |
| ϕja | Thermal resistance of the package of IC die 10 |
| Iref (Tj) | Reference current signal flowing in current mirror controlling diode 315F (FIG. 3) |
| R | Resistance of resistor 315G (FIG. 3). [IS THIS315G?] |
| $Vbe_{nom}$ | Base-emitter voltage of transistor 315D at Tj = Tnom |
| G | Scale factor |
| Vreg | Voltage regulated by the shunt regulator at node 217A |
| $\frac{W}{L}$ | FET channel width to length ratio |
| TCj | Temperature coefficient of forward biased p-n junction |

$$Tj \cong Ta + Pmax \cdot \theta ja \quad (1)$$

$$Pmax = Vreg \cdot Iref \cdot G \quad (2)$$

$$Iref(Tj) = [Vbe_{nom} + (Tj - Tnom)TCj] \cdot \frac{1}{R} \quad (3)$$

$$TCj \cong -2mV/^{\circ}\,C. \quad (4)$$

$$G = \left[\frac{\left(\frac{W}{L}\right)315A}{\left(\frac{W}{L}\right)315F}\right] \cdot \left[\frac{\left(\frac{W}{L}\right)326A}{\left(\frac{W}{L}\right)314F}\right] \quad (5)$$

wherein 315A, 315F, 326A and 314F refer to the devices shown in FIG. 3. For example, (W/L) 326A is the channel width to length ratio of FET 326A in FIG. 3. On substitution of equations (2), (3) into equation (1)

$$Tj = Ta + Vreg \cdot [Vbe_{nom} + (Tj - Tnom) \cdot TCj] \cdot \left[\frac{G \cdot \theta ja}{R}\right] \quad (6)$$

Rearrange equation (6) as follows $$Tj \cdot \left[1 - \left(\frac{G \cdot \theta ja \cdot Vreg}{R}\right) \cdot TCj\right] = Ta + \left(\frac{G \cdot \theta ja \cdot Vreg}{R}\right) \cdot (Vbe_{nom} - Tnom \cdot TCj \quad (7)$$

Rearrange equation (7) as follows $$Tj = Ta\left[\frac{1}{1 - \left(\frac{G \cdot \theta ja \cdot Vreg}{R}\right) \cdot TCj}\right] + \left[\frac{1}{\frac{1}{\left(\frac{G \cdot \theta ja \cdot Vreg}{R}\right)} - TCj}\right] \cdot (Vbe_{nom} - Tnom \cdot TCj) \quad (8)$$

$$\frac{\partial Tj}{\partial Ta} = \frac{1}{1 - \frac{G\theta jVreg}{R} TCj}$$

In one embodiment, it is desirable that Tj be independent of Ta, and so $$\frac{\partial Tj}{\partial Ta}$$

of equation (9) is minimized, by varying one or more of the parameters described above, e.g. parameters G and R so that the denominator of equation (9) is made as large as possible. Equation (8) is based on a CTAT current reference signal that is created by a forward biased p-n junction (see Equation 2). The CTAT reference signal helps reduce $$\frac{\partial Tj}{\partial Ta}$$

while ensuring that Pmax and Tj do not exceed the maximum ratings for the IC process and packaging. Pmax and Tj increase when $$\frac{\partial Tj}{\partial Ta}$$

decreases. Therefore, to keep Pmax and Tj below the maximum ratings, $$\frac{\partial Tj}{\partial Ta}$$

is not made too small.

In one example, θja=100° C./W Ti(max)=150° C. Pmax=1.23 w. If G=1000 and Vreg=4 v, then Iref=307.5 $\mu$A and R=1.48 k ohms, so the derivative is no smaller than $$\left.\frac{\partial Tj}{\partial Ta}\right|_{min} = \frac{0.65\ C.}{C.}$$

(in this example). A skilled engineer can perform a design tradeoff between the parameters described above, in the normal manner.

Note that as the magnitude of the temperature coefficient of the CTAT reference signal increases, $$\frac{\partial Tj}{\partial Ta}$$

can be made smaller without causing Pmax and Tj to exceed the corresponding maximum ratings. Therefore, a CTAT reference signal is a critical aspect in one embodiment of the invention.

Note that a reference signal that is CTAT need not be created from the base emitter voltage, and instead a thermistor or other temperature sensor can be used in other embodiments. Moreover, the die temperature sensitivity of overpower detector 110 (FIG. 2A) need not be implemented using a CTAT signal, instead two separate signals can be used in overpower detector 110 to open protection switch 13, wherein one signal is a non-CTAT reference signal, and the other signal is indicative of the die temperature.

| Parameter | Typical Values |
| --- | --- |
| Tj | 150° C. |
| Tnom | 27° C. |
| Pmax | 100 mW |
| φja | 100° C./W |
| $Vbe_{nom}$ | 0.7 V |
| Vreg | 5 V |
| TCj | −0.002 V/° C. |

Therefore, if the temperature Tj is greater than a maximum temperature for the die that implements regulator 300, the skilled engineer can change the scale factor in diodes 326A, and 315F (e.g. by changing the width to length ratio of the FET channel), as well as the resistance of resistor 315C.

Accordingly, numerous such modifications and adaptations of the embodiments and implementations described herein are encompassed by the attached claims.

What is claimed is:

1. A circuit coupled to a power supply, the circuit comprising:

a regulator having an input terminal, an output terminal and a control line, the input terminal and the output terminal being coupled to a power supply in parallel with a load, wherein during operation:

the regulator passes a shunt current drawn from the input terminal to the output terminal, and changes the shunt current to maintain constant a voltage or a current supplied to the load; and the regulator drives a signal active on the control line when the dissipated power exceeds a threshold; and a switch coupled to the control line, wherein during operation:

the switch opens a path between the power supply and the input terminal and disrupts the shunt current drawn by the regulator, in response to the active signal on the control line.

2. The circuit of claim 1 wherein:

the switch is also coupled in series with the load and disrupts the supply of power to the load in response to the active signal on the control line.

3. The circuit of claim 1 wherein the regulator comprises:

a current sensor coupled between the input terminal and the output terminal, wherein during operation:

the current sensor generates a signal indicative of power dissipated in the regulator; and a signal comparator having a status line and a control terminal, the status line being coupled to the current sensor, the control terminal being coupled to the control line, wherein during operation:

the signal comparator changes a control signal on the control terminal after comparing the magnitude of the status signal with the magnitude of a reference signal.

4. The circuit of claim 3 wherein the regulator further comprises:

a storage element coupled between the control terminal of the signal comparator and the control line, wherein during operation:

the storage element stores an active signal received from the control terminal; and the storage element supplies a stored signal on the control line.

5. The circuit of claim 4 wherein:

the storage element is coupled to the power supply, wherein during operation:

the storage element stores an inactive signal when voltage supplied by the power supply falls below a predetermined value, and supplies the inactive signal on the control line; and the switch couples the power supply to the load and to the regulator in response to the inactive signal.

6. The circuit of claim 1 wherein:

the switch and the regulator are formed as portions of an integrated circuit die that includes the load; and the switch includes a field effect transistor.

7. A circuit for regulating the power supplied by a power supply to a load, the circuit having a current input terminal, a current output terminal and a power shutoff line, the circuit comprising:

a shunt regulator having a shunt input line coupled to the current input terminal, a shunt output line coupled to the current output terminal and a status terminal, wherein during operation:

the shunt regulator supplies on the status terminal a signal related to the magnitude of power dissipated in the shunt regulator; and an overpower detector having a power status line coupled to the status terminal, and a power shutoff terminal coupled to the power shutoff line wherein during operation:

the overpower detector drives a signal active on the power shutoff terminal when the signal on the power status line exceeds a threshold.

8. The circuit of claim 7 wherein the shunt regulator includes:

a current sink coupled between the shunt input line and the shunt output line;

wherein during operation:

the current sink passes a bleed current from the shunt input line to the shunt output line; and a current sensor coupled in series with the current sink between the shunt input line and the shunt output line, the current sensor being coupled to the status terminal, wherein during operation:

the current sensor passes to the status terminal a signal indicative of the magnitude of the bleed current.

9. The circuit of claim 8 wherein:

the current sensor includes one half of a current mirror; and the overpower detector includes the other half of the current mirror.

10. The circuit of claim 9 wherein:

the current sensor includes, as one half of the current mirror, a p-channel field effect transistor having:

a gate shorted to a drain;

a source coupled to the shunt input line; the drain coupled to the shunt output line; and the gate coupled to the status terminal.

11. The circuit of claim 8 wherein the shunt regulator further includes:

a current controller coupled between the shunt input line and the shunt output line in parallel with the current sink and the current sensor, the current controller having a control line coupled to the current sink, wherein during operation:

the current controller changes an analog signal on the control line in response to a change in voltage at the current input terminal thereby to maintain the voltage at the current input terminal at a predetermined level.

12. The circuit of claim 7 wherein the overpower detector includes:

a reference signal generator having a reference signal line; and a signal comparator coupled to each of the power shutoff terminal, the power status line and the reference signal line; wherein during operation:

the signal comparator generates a signal supplied on the power shutoff terminal when the signal on the power status line is smaller than a signal on the reference signal line.

13. The circuit of claim 12 wherein:

the reference signal generator changes the signal on the reference signal line in a manner complimentary to absolute temperature.

14. A method for operating a shunt regulator, the method comprising:

passing a shunt current through the shunt regulator, the shunt regulator being coupled in parallel with a load for controlling the power supplied from a power supply to the load;

generating a power status signal related to the magnitude of the shunt current; and opening a switch in a path between the shunt regulator and the power supply when the power status signal indicates that said magnitude exceeds a predetermined magnitude.

15. The method of claim 14 further comprising:

closing the switch when the voltage provided by the power supply falls below a threshold voltage.

16. The method of claim 14 wherein:

the generating includes using one-half of a current mirror to convert a portion of the shunt current to voltage.

17. The method of claim 14 further comprising:

generating the reference signal based on the bandgap voltage of a semiconductor material.

18. The method of claim 14 further comprising:

generating an active binary signal when the power status signal indicates that said magnitude exceeds a predetermined magnitude; and storing the active binary signal.

19. The method of claim 14 further comprising:

clearing the active binary signal when the voltage provided by the power supply falls below a threshold voltage.

20. The method of claim 14 further comprising:

generating the reference signal in a manner complementary to absolute temperature.

* * * * *

UNITED STATES PATENT AND TRADEMARK OFFICE

CERTIFICATE OF CORRECTION

PATENT NO. : 6,141,193
DATED : October 31, 2000
INVENTOR(S) : Mark J. Mercer

It is certified that error appears in the above-identified patent and that said Letters Patent is hereby corrected as shown below:

Column 16,
Line 56, please delete "SB" and insert -- 5B --;

Column 17,
Line 67, please delete "SB" and insert -- 5B --;

Column 19,
Line 58, please delete "C./W" and insert -- C/W --
Line 59, please delete the space after 4;

Signed and Sealed this

Twenty-fifth Day of February, 2003

JAMES E. ROGAN
*Director of the United States Patent and Trademark Office*